(12) United States Patent
Brunton et al.

(10) Patent No.: US 10,717,235 B2
(45) Date of Patent: Jul. 21, 2020

(54) METHOD FOR JOINT COLOR AND TRANSLUCENCY 3D PRINTING AND A JOINT COLOR AND TRANSLUCENCY 3D PRINTING DEVICE

(71) Applicant: Fraunhofer-Gesellschaft zur Förderung der angewandten Forschung e.V., München (DE)

(72) Inventors: Alan Brunton, Grenoble (FR); Can Ates Arikan, Darmstadt (DE); Philipp Urban, Seeheim (DE); Tejas Madan Tanksale, Darmstadt (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 72 days.

(21) Appl. No.: 15/791,126

(22) Filed: Oct. 23, 2017

(65) Prior Publication Data

US 2018/0117849 A1     May 3, 2018

(30) Foreign Application Priority Data

Oct. 24, 2016   (EP) ..................................... 16195377

(51) Int. Cl.
    *B29C 64/393*     (2017.01)
    *B29C 64/386*     (2017.01)
    (Continued)

(52) U.S. Cl.
    CPC .......... *B29C 64/393* (2017.08); *B29C 64/112* (2017.08); *B29C 64/386* (2017.08);
    (Continued)

(58) Field of Classification Search
None
See application file for complete search history.

(56) References Cited

U.S. PATENT DOCUMENTS

2012/0255663 A1*   10/2012   Holroyd ................ B29C 65/002
                                                                                       156/64
2015/0258770 A1*   9/2015   Chan ...................... B33Y 50/02
                                                                                      700/98

(Continued)

FOREIGN PATENT DOCUMENTS

EP        3023229 A1     5/2016
GB        2190570 A   * 11/1987 ............. G06T 17/00
GB        2541163 A     2/2017

OTHER PUBLICATIONS

Y. Dong et. Al., Fabricating spatially—varying subsurface scattering. ACM TOG, Proc. SIGGRAPH, 29, 4, 2010.

(Continued)

*Primary Examiner* — Fan Zhang
(74) *Attorney, Agent, or Firm* — Bonini IP Law, LLC; Frank J. Bonini, Jr.

(57) ABSTRACT

A method and a device for three-dimensional joint color and translucency printing, wherein at least a first non-transparent printing material with a first printing material color and at least one transparent printing material (6) is used to construct a printing object (7), wherein an arrangement of the printing materials is determined based on a desired color reproduction of the printing object (7), wherein the arrangement of the printing materials is determined based on a desired translucency reproduction of the printing object (7).

21 Claims, 5 Drawing Sheets

Figure 1:
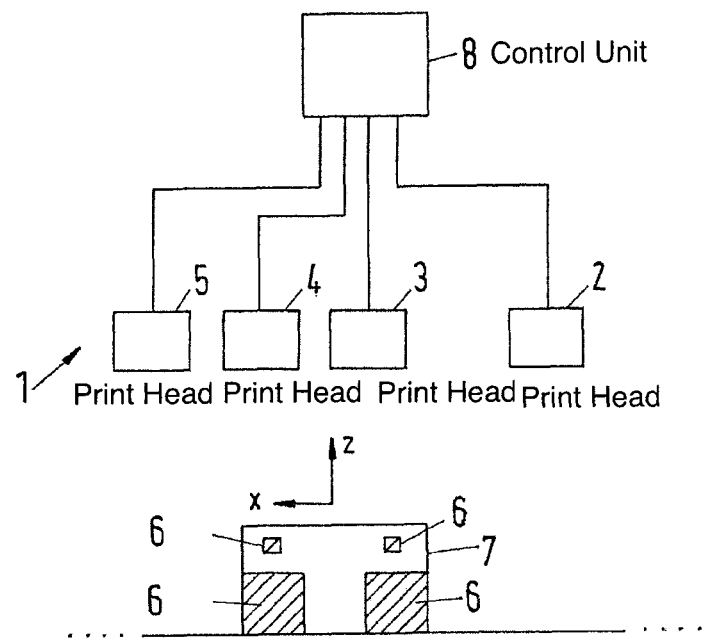

(51) Int. Cl.
  *B33Y 50/02* (2015.01)
  *H04N 1/54* (2006.01)
  *B33Y 10/00* (2015.01)
  *B33Y 30/00* (2015.01)
  *B33Y 70/00* (2020.01)
  *B29C 64/112* (2017.01)

(52) U.S. Cl.
  CPC ............ *B33Y 10/00* (2014.12); *B33Y 30/00* (2014.12); *B33Y 50/02* (2014.12); *B33Y 70/00* (2014.12); *H04N 1/54* (2013.01); *B29K 2995/0021* (2013.01); *B29K 2995/0029* (2013.01)

(56) References Cited

U.S. PATENT DOCUMENTS

2016/0229124 A1  8/2016  Yoshikawa
2016/0342150 A1* 11/2016  Jin .................... G05B 15/02

OTHER PUBLICATIONS

Jacobson et. al., Robust inside-outside segmentation using generalized winding numbers, ACM Transaction in Graphics (Proc. SIGGRAPH) 32, 4, 2013.
A. Brunton et. al., "Pushing the limits of 3 D color printing: Error diffusion with translucent materials," ACM transactions on Graphics 35, Jan. 12, 2015, 4:1-4:13.
Felzenszwalb, P. and Huttenlocher, D., "Distance Transforms of Sampled Functions, Theory of Computing", vol. 8, pp. 115-428, 2012.
Minh Bui et al.: "Visual perception of 3D printed translucent objects", Nov. 7, 2016, XP055366266, Retrieved from the Internet: https://www.cuttlefish.de/assets/publications/2016CIC_BUI_PG_94.pdf.
Hasan, M., Fuchs, M., Matusik, W., Pfister, H., and Rusinkiewicz, S. 2010. Physical reproduction of materials with specified subsurface scattering. ACM TOG (Proc. SIGGRAPH) 29,3.
Montag, Ethan D., and David C. Wilber. "A comparison of constant stimuli and gray-scale methods of color difference scaling." Color Research & Application 28.1 (2003): 36-44.
Urban, P., Rosen, M. R., Berns, R. S., & Schleicher, D. (2007). "Embedding non-Euclidean color spaces into Euclidean color spaces with minimal isometric disagreement." JOSA A, 24(6), 1516-1528.
Lissner, I. and Urban P., "Upgrading color-difference formulas." JOSA A 27.7 (2010): 1620-1629.
P. Urban et al.: Redefining A in RGBA: Towards a Standard for Graphical 3D Printing.

* cited by examiner

METHOD FOR JOINT COLOR AND TRANSLUCENCY 3D PRINTING AND A JOINT COLOR AND TRANSLUCENCY 3D PRINTING DEVICE

BACKGROUND OF THE INVENTION

1. Field of the Invention

The invention relates to a method for three-dimensional joint color and translucency printing and a three-dimensional joint color and translucency printing device.

2. Brief Description of the Related Art

Three-dimensional printing or 3D printing refers to processes for printing a 3D object which can be also refer to as printing object. Existing 3D printers can use a variety of printing materials, wherein only few materials can be combined simultaneously for printing a printing object. As a result, the color gamut of the said 3D printing device is restricted and corresponds to only a fraction of the color space as only a limited number of colors can be generated, in particular via subtractive or autotypical mixture.

Therefore, printing objects or parts thereof which have a color outside the color gamut of the 3D printing device result in a false color reproduction.

In addition to a color reproduction, it is desirable to provide a realistic reproduction of translucent objects, in particular involving multiple fully or partially transparent geometries.

Previous approaches for reproduction of color has focused only on albedo color fabrication which is for example described in the document Brunton, Alan, Can Ates Arikan, and Philipp Urban, "Pushing the limits of 3d color printing: Error diffusion with translucent materials." ACM Transactions on Graphics (TOG) 35.1 (2015): 4. Other approaches focus only on translucency fabrication, for example the method disclosed in the document "Y. Dong et. Al., Fabricating spatially—varying subsurface scattering. ACM TOG, Proc. SIGGRAPH, 29, 4, 2010.

EP 3023229 A1 discloses a method for 3D color printing.

The postpublished GB 1512434.0 discloses a method for three-dimensional color printing, wherein at least a first printing material with a first printing material color and at least another printing material with another printing material color is used to construct a printing object, wherein an arrangement of the printing materials in a surface region and a near surface interior region of the printing object is determined based on a desired color reproduction of the printing object, wherein for each voxel of the surface region and the near surface interior region:
  a printing material color vector is assigned to the voxel,
  a printing material sequence vector is determined depending on the printing material color vector,
  one printing material of the printing material sequence vector is selected depending on a distance of the voxel to its respective closest surface voxel,
  the selected printing material is assigned to the voxel.

Although EP 3023229 A1 and GB 1512434.0 consider the translucency of the available printing materials which are combined within a single printing object, the disclosed methods exclusively focus on accurately reproducing albedo color of a 3D printing objects in a manner which is considers the translucency of the available printing materials for said color reproduction but without controlling the translucency resulting from combining said materials. In other words, the disclosed color printing methods do not allow reproducing both the perceived color and the perceived translucency of the resulting printing object. In particular, the disclosed color printing methods do not consider the perceptual dependency between color and translucency and do not allow to preserve the perceived color as the desired translucency changes, and vice versa.

There is the technical problem of providing a method for 3D joint color and translucency printing and a 3D joint color and translucency printing device by which a quality of the printing object, especially the quality of a color and translucency reproduction, is improved. In particular, it is a technical problem to allow reproducing both the perceived color and the perceived translucency of the resulting printing object and, more particular, to preserve the perceived color as the desired translucency changes, and vice versa. Further aspects are to provide a method for 3D joint color and translucency printing and a 3D joint color and translucency printing device which allow a fast computational and efficient processing of desired printing data, in particular a generation of control data for printing.

The document EP 3023229 A1 corresponds in term of contents to the document "Brunton, Alan, Can Ates Arikan, and Philipp Urban, "Pushing the limits of 3d color printing: Error diffusion with translucent materials." ACM Transactions on Graphics (TOG) 35.1 (2015): 4."

The solution to said technical problem is provided by the invention.

SUMMARY OF THE INVENTION

A method for three dimensional joint color and translucency printing (3D printing) is proposed. At least a first non-transparent printing material with a first printing material color and at least one transparent printing material is used to construct a printing object. In other words, the at least first non-transparent printing material and the at least one transparent printing material are used to generate or build the printing object or a part thereof. The printing object can denote the object, which is to be printed, i.e. constructed by the proposed method. The 3D printing process used to construct the printing object is known to the skilled person. A non-transparent printing material can denote a non-translucent, in particular a fully opaque, printing material. A transparent printing material can denote a translucent, in particular a fully translucent, printing material.

In particular, the printing process can comprise the generation of successive slices, i.e. layers, in a vertical direction (z-direction), wherein the slices can be oriented parallel to a plane spanned by a longitudinal direction (x-direction) and lateral direction (y-direction). Such a slice can also be referred to as x, y-slice. The mentioned directions can provide directions of a reference coordinate system. A slice denotes a two-dimensional cross section of the printing object, e.g. with predetermined thickness, wherein the section plane is perpendicular to the aforementioned vertical direction.

Before printing, e.g. in a modelling step, a model of the 3D printing object can be created, e.g. by computer added design (CAD). Such a model can also be generated by 3D—scanning with captured color and translucency texture data. The model can encode a desired color and translucency reproduction of the printing object. The desired color and translucency reproduction is a specification of what color and translucency perception from the printing object a user wishes to have. Thus, the desired color and translucency reproduction can also be referred to as predetermined or prescribed color and translucency reproduction. The model or specification can be independent of the 3D printing device which is to be used.

By said modelling step, input data for the proposed method can be generated. The input data can encode color and translucency information of the printing object. In particular, color and translucency information can be encoded by a RGBA signal on the object's surface, for example in form of a RGBA texture or per-vertex RGBA attributes. An RGBA signal can e.g. be provided by a RGBA vector, wherein entries of the "RGB" portion encode a color information and the entry of the "A" portion encodes a translucency information. Thus, a desired color and translucency can be assigned to the printing object or parts thereof. Further, said desired color and translucency can change smoothly or abruptly from one location on the object's surface to another.

The input data can encode a desired, i.e. predetermined, color and translucency reproduction, in particular color and translucency information, of the printing object, in particular independent of a 3D printing device. Examples for a possible data format of input data is the so-called .obj data format, the .wrl data format or the .3mf data format whereas the color and translucency is embedded in such formats as a RGBA texture file encoded e.g. in a PNG data format or a TIFF data format. For example, the .3mf data format is created to store textured 3D models for 3D printing by an industrial consortium.

Preferably, the desired color and translucency information of the printing object can be provided by a texture image, wherein every point or selected points on a 3D surface representation of the printing object has assigned coordinates in the domain of a texture image.

Based on the said input data, control data for a 3D printing device can be generated, wherein the control data is used to control the printing process. The control data can encode color and translucency information of the printing object, e.g. in form of a color and translucency vector, wherein a color component of said color and translucency vector corresponds to coordinates of a desired color in a color space (e.g. sRGB) and a translucency component to a degree of translucency. The desired color and translucency encoded by the input data does, however, not necessarily need to correspond to an available printing material color and translucency.

The 3D joint color and translucency printing process can e.g. be an extrusion-based process, a wire-based process, a granular-based process, a power-bed process or a lamination-based process.

Preferably, the 3D joint color and translucency printing process is a polymerisation-based process. In such processes, liquid printing materials with predetermined printing material colors and translucencies, e.g. liquid photo polymers, are applied into or onto a layer and exposed to radiation, e.g. to a laser beam, in order to harden to exposed printing material. For example, printing materials can be provided by printing inks, wherein the printing inks can be hardened or cured after the application on to or into a layer, e.g. by exposure to light, in particular to UV radiation.

The printing inks can have different colors and degrees of translucency. The process can also be referred to as polyjetting which is also known as multi-jet processing.

As described in EP 3023229 A1, it is further possible to use at least one support material with a first support material color to support the construction of the printing object.

Preferably, more than one non-transparent printing material is used to construct the printing object, wherein all non-transparent printing materials have different printing material colors. The colors of the non-transparent printing materials can define corners of a color gamut. The color gamut is defined by mixing the printing materials. It is, of course also possible, to use more than one transparent printing material. Preferably, however only one transparent printing material is used to construct the printing object.

Further, an arrangement of the printing materials, i.e. an arrangement of the at least first non-transparent printing material and the at least one transparent printing material, is determined based on a desired color reproduction of the printing object. The determination can be performed automatically. An arrangement of the printing materials denotes an arrangement of materials provided by the printing process, i.e. an arrangement for constructing or building the printing object, in particular by a 3D printing device. More particular, the arrangement of the printing materials denotes an arrangement within a printing space, wherein the printing space is the space in which the printing object is constructed by the 3D printing device. The 3D printing device can e.g. be a standard 3D printer.

Further, the arrangement of the printing materials, i.e. an arrangement of the at least first non-transparent printing material and the at least one transparent printing material, is, in particular additionally, determined based on a desired translucency reproduction of the printing object.

In other words, the arrangement of the printing materials is determined based on both, a desired color and translucency reproduction of the printing object. In particular, the arrangement of the printing materials can be determined such that both, desired color and a desired translucency, of the printing object are reproduced. More particular, the arrangement of the printing materials can be determined such that a desired color is reproduced, i.e. preserved, for varying or changing translucency and/or such that a desired translucency is reproduced, i.e. preserved, for varying or changing color.

In other words, the arrangement of printing materials during printing of the printing object is chosen such that the printing object or volume fractions thereof reproduce the desired color and translucency or such that a coloring and translucency defect which denotes a deviation between a desired color and translucency reproduction and the provided color and translucency reproduction is reduced or minimized.

The arrangement of printing materials can be determined based on optical characteristics of the printing materials, e.g. based on scattering and or translucent characteristics, in particular such that the printing object or volume fractions thereof reproduce the desired color and translucency wherein said coloring and translucency defect is reduced or minimized.

Further, the printing materials can be arranged according to the determined arrangement in a printing step. Within the printing step, a printing device can be controlled such that the printing materials are arranged accordingly. A reproduction of colors (or color tones) and translucency can be generated by an adequate spatial arrangement of unit volumes (defined by the printer resolution), referred to as voxels, filled by printing materials with different non-transparent printing material colors or filled by transparent printing material.

It is possible to generate machine-readable data, i.e. the aforementioned control data, to instruct a printing device to dispense exactly one or more specific printing material(s) at a specific location, e.g. the location of a voxel, for constructing the printing object. It is further possible that machine-readable data is generated such that a printing device is instructed to dispense no printing material(s) at a specific location or support material which can be removed in a post process step.

The proposed method advantageously improves both, the color reproduction as well as the translucency reproduction of the resulting printing object.

The key differences between the aforementioned EP 3023229 A1 and GB 1512434.0 and the current invention are twofold. First, whereas the objective of EP 3023229 A1 and GB 1512434.0 was to accurately reproduce albedo color of a 3D printing object in a manner, which is adaptive to the translucency of the available printing materials without trying to control the translucency resulting from combining said materials, the current invention is concerned with jointly accurately reproducing both the perceived color and the perceived translucency of the resulting printing object. In this case it is important that the perceived color is preserved while the perceived translucency is varied, and vice versa.

Second, whereas in EP 3023229 A1 and GB GB 1512434.0 the technical challenges lay primarily in how to expand the color gamut (number of colors that can be produced by the 3D printing device) while avoiding visible artifacts, which are dependent on the translucency of the available printing materials, to do so in a manner that is adaptive to the surface geometry (shape) of the 3D printing object and within computational constraints concerning processing time, memory consumption and scalability for large 3D printing objects, technical challenges addressed by the current invention lie in the global nature of the interaction of light with nearly transparent materials, and in the perceptual dependency between color and translucency and how adjusting one influences the other. In particular, the present invention necessarily considers the entire volume of the 3D printing object.

In other words, the proposed method advantageously allows reproducing both the perceived color and the perceived translucency of the resulting printing object with a desired quality and in particular preserving the perceived color as the desired translucency changes, and vice versa. In other words, color and translucency information of the desired color and translucency reproduction are jointly considered to determine a voxel-based arrangement of printing materials at a native resolution of a 3D printing device.

In particular, the proposed method is based on reproducing perceptual translucency cues instead of reproducing (approximate) physical parameters governing light transport within a desired material. In particular, the method is not based on a BSSRDF (Bidirectional Scattering Surface Reflectance Distribution Function) measurement and processing which reduces computational costs and also bypasses the limitations of existing printing systems capable of reproducing only a constrained set of BSSRDFs.

The method advantageously takes benefit from the fact that human perception of translucency is not primarily based on the underlying interactions of light with a given material and is rather driven by simple high-level cues such as changes in contrast of either the objects' surface itself or light from the background passing through the object. In fact, the perceptual notion of translucency encompasses multiple underlying aspects of physical light transport: lateral light transport within the object produces blurring of surface features and albedo color, vertical light transport allows to see light passing through the object. The proposed method is therefore based on translucency metamers, reproducing trichromatic color attributes (albedo color) and perceptual translucency cues instead of physical quantities of light transport and attenuation.

Further, a voxel-based representation of a printing object is determined. Further, a desired color information and a desired translucency information, e.g. a desired color value and translucency value, is assigned to each voxel of at least a subset of all voxels of the voxel-based representation of the printing object. A subset comprises at least one voxel, preferably more than one voxel.

It is, for instance possible, to assign said desired color information and a desired translucency information to all voxels of a surface layer voxel set (which will be explained later) and to all voxels of a near-surface interior voxel set (which will be explained later). It is possible but not compulsory to assign color information and a desired translucency information to each of the remaining voxels of the voxel-based representation. It is e.g. possible to assign only a desired translucency information to each of the remaining voxels of the voxel-based representation. In other words, a desired color information is only assigned to each voxel of the surface layer voxel set and the near-surface interior voxel set, wherein a desired translucency information is assigned to each voxel of the voxel-based representation of the printing object.

It is, for instance, possible to assign a desired color and translucency information to a surface or surface section of the printing object, e.g. in the modelling step. In particular, a RGBA vector can be assigned to the surface or surface portion, wherein the RGBA vector comprises a color component, e.g. (a) color parameter(s), and a translucency component, e.g. a translucency parameter. Color parameters, i.e. color-related entries, of the RGBA vector can e.g. be provided by the RGB parameters, wherein a translucency parameter, e.g. a translucency-related entry, of the RGBA vector can be provided by the A parameter.

Such a desired color and translucency information does not necessarily need to equal to a color of one of the printing materials. Therefore, the desired color and translucency information can be converted into a printing material color and translucency vector, wherein the printing material color vector can e.g. comprise one entry per (non-transparent) printing material (color-related entry), wherein the value of such an entry corresponds to a portion of the respective printing material to reproduce the desired color.

Further, such a printing material color and translucency vector can comprise one entry for the translucency (translucency-related entry), wherein the value of said entry can correspond to a degree of translucency to reproduce the desired translucency. The value can also correspond to a portion of the relevant volume which should be assigned a transparent printing material. For example, the RGBA vector can be mapped to a printing material color and translucency vector (CMYKγ vector) of (c, m, y, γ, where c is the tonal value for cyan, m is the tonal value for magenta, y is the tonal value for yellow and γ is parameter representing the degree of translucency). Entries of the printing material color vector can therefore also be referred to as tonal values if they represent an amount of a non-transparent printing material and as translucency value if they represent an amount of the transparent printing material. Color parameters, i.e. color-related entries, of the CMYKγ vector can e.g. be provided by the CMYK parameters, wherein a translucency parameter, e.g. a translucency-related entry, of the CMYKγ vector can be provided by the γ parameter. It is to be noted, however, that the CMYK parameters do not only affect the color reproduction and the γ parameter will does not only affect the translucency reproduction. In contrast, the change of the CMYK parameters will affect the reproduction of both, color and translucency. Also the change of the γ parameter will affect the reproduction of both, color and translucency. In other words, it may be required to also adjust the CMYK parameters to achieve a desired translucency reproduction and/or to adjust the γ parameter to achieve a desired color reproduction. As a result, the printing material and translucency vector can also be referred to as tonal value and translucency vector.

It is possible that a reference non-transparent printing material color exists, wherein the printing material color and translucency vector does not comprise an entry (tonal value) related to the reference printing material color. The reference printing material color can be the color of one of the used printing materials. The reference printing material color can e.g. be a white color. Using white color as the reference printing material advantageously allows to apply existing color-management techniques for subtractive mixtures.

A color-related entry can be a numerical value encoding a desired intensity of said printing material color, in particular in a volume fraction of the printing object. The numerical values can e.g. be chosen from a printing material color value interval, can e.g. an interval from 0 (inclusive) to 1 (inclusive) or an interval from 0 (inclusive) to 255 (inclusive). The translucency-related entry can be a numerical value encoding a desired degree of translucency, in particular in said volume fraction of the printing object. The numerical value can e.g. be chosen from translucency value interval, e.g. an interval from 0 (inclusive) to 1 (inclusive) or an interval from 0 (inclusive) to 255 (inclusive).

In this context, a value of "1" of the translucency-related entry of a RGBA vector can correspond to no translucency, i.e. to opacity, and a value of "0" to full translucency, i.e. transparency. Further, a value of "1" of the translucency-related entry of a CMYKγ vector can correspond to full translucency, i.e. transparency, and a value of "0" to no translucency, i.e. to opacity.

It is possible to discretize the geometry of the printing object into a set of voxels, i.e. boxes of elementary volume. An exemplary method of such a discretization (voxelization) will be described later.

It is further possible to determine so-called surface voxels. Surface voxels can be voxels of a boundary layer of the printing object, wherein the boundary layer is the barrier layer or the transition layer between the printing object and the exterior. Thus, surface voxel can comprise the voxels of the printing object that separate interior from external voxels or voxels which are intersected by a printing object surface. Interior voxels can denote the remaining voxels of the printing object. In particular, an interior voxel can denote an object voxel which is fully enclosed by surface voxels.

Further, the color value and the translucency information assigned to one voxel is transformed into a printer-specific printing material color and translucency vector.

It is in particular possible that a desired color and translucency information, e.g. a RGBA vector, is assigned to each voxel, wherein this desired color and translucency information is subsequently converted into the printing material color and translucency vector. Then, the printing material color and translucency vector is assigned to the voxel.

Alternatively, the desired and color and translucency information can first be converted into the printing material color and translucency vector which is subsequently assigned to a voxel.

In particular, the color value and the translucency information within a nearly or quasi perceptually uniform space which will be explained later can be transformed into the printer-specific printing material and translucency vector.

It is for instance possible to transform a color value and translucency information within a CIELABβ space into a printer-specific printing material color and translucency vector which can e.g. be provided by a CMYKγ vector. The CMYKγ vector has been explained before. It is also possible to transform a color value and the translucency information within a perceptually non-uniform space, e.g. a RGBA vector, into the printer-specific printing material and translucency vector, e.g. the CMYKγ vector.

Preferably, the transformation of the color value and the translucency information into the printer-specific printing material color and translucency vector is a transformation which is a function of the input parameters "color value", "translucency information" and results in the printer-specific printing material color and translucency vector. Alternatively, the color value can be transformed into the printer specific printing material color vector and the translucency information can be transformed into the printer specific translucency vector. As explained before, the result of said transformation is a vector comprising tonal values and a translucency parameter.

This advantageously allows a computationally fast efficient determination of the printer-specific printing material vector which can subsequently be used for generating the printer control data.

Further, an assignment of a printing material to a voxel is based on the printer-specific material color and translucency vector. This means that exactly one or more printing materials are assigned to a voxel based on the printer-specific material color and translucency vector. A method for such an assignment is known to the skilled person. Exemplary methods for such an assignment are disclosed in this disclosure.

In particular, one of the printing materials, in particular a non-transparent printing material or the transparent printing material, is assigned to each voxel, in particular to each surface voxels and to each interior voxel. The assignment of a printing material to a voxel is based on the desired color and translucency reproduction of the printing object.

It is, for instance, possible to determine a non-transparent printing material based on the printing material color and translucency vector assigned to a voxel. Then, the respective printing material can be used to construct, i.e. fill, said voxel.

It is also possible to determine the transparent printing material based on the printing material color and translucency vector assigned to a voxel.

Preferably, however, a non-transparent printing material can be assigned to each voxel of the printing object. Subsequently, an assignment of a non-transparent printing material to a voxel is replaced by an assignment of the transparent printing material based on the printing material color and translucency vector assigned to said voxel.

Then, the transparent printing material can be used to construct or fill said voxel.

The assignment of one of the (non-transparent) printing materials to a voxel based on the printing material color and translucency vector can e.g. be provided by a half-toning algorithm. Half-toning algorithms are known to the skilled person. Preferred half-toning algorithms are described in the aforementioned EP 3023229 A1.

It is possible to assign a printing material only to voxels of the surface layer voxel set, e.g. by performing a half-toning algorithm. An assignment of a printing material to interior voxels, in particular to interior voxels of a near-surface interior voxel set (which will be described later) can subsequently be determined based on the printing material assignment to the voxel of a surface layer voxel set.

In general, the assignment of a printing material to an interior voxel can be performed without performing a half-toning algorithm. Alternatively, it is possible to perform a half-toning algorithm to assign a printing material to voxels of the surface layer voxel set and to perform a half-toning algorithm to assign a printing material to interior voxels, in particular to voxels of the near-surface interior voxel set, wherein the half-toning algorithms are performed independently.

Within the assignment, e.g. within a half-toning algorithm, a printing material color quantization can be performed for each voxel. As a result, a quantized printing material color and translucency vector can be assigned to a voxel. It is possible to perform quantization for all entries of the printing material color and translucency vector, in particular of the color-related and the translucency related entries. Preferably, however, quantization is only performed for the color-related entries of the printing material color and translucency vector. Preferred quantization algorithms are described in the aforementioned EP 3023229 A1.

Further, an error due to the printing material color quantization can be distributed to neighbouring voxels, e.g. using an error diffusion mask or error diffusion filter. Thus, the half-toning algorithm can comprise an error diffusion step. Preferred error distribution algorithms are described in the aforementioned EP 3023229 A1.

The assignment of a printing material to a voxel can then be based on the quantized printing material color and translucency vector which is assigned to the respective voxel.

The step of assigning a desired color value and a desired translucency information to each voxel and/or step of transforming the color value and the translucency information assigned to one voxel into a printer-specific printing material color and translucency vector and/or the step of assigning of a printing material to a voxel based on the printer-specific material color and translucency vector are in particular performed such that both, the desired color and a desired translucency, of the printing object are reproduced. In other words, each step, in particular the transformation into the printer-specific printing material color and translucency vector and the step of assigning of a printing material to a voxel consider color and translucency information jointly. This results in printing a printing object with a perceptually accurate color and a perceptually accurate translucency.

The steps can be steps of a digital processing chain, starting from device-independent input data and ending at control data for a 3D printing device for arranging printing materials. Each step provides a step for processing information, e.g. the input data, encoding a desired color and translucency reproduction of the printing object, such that a voxel arrangement of printing materials is determined which reproduces the color and translucency in a perceptually accurate way. The reproduction of the color and the translucency can be provided, however, within the limits of the printing device. Printing devices can usually not reproduce all colors and/or all translucency levels which limits the reproduction range.

Further, the printing process is controlled as a function of the resulting assignment of printing materials to voxels. The printing process can be performed by the printing device. During the printing process, the printing object is constructed, in particular by arranging the printing materials according to the voxel-based representation.

It is, for instance, possible that a printing device is controlled such that the volume section of the printing object which corresponds to a voxel is provided or constructed by the printing material(s) assigned to the voxel. That a printing material is used to construct the printing object means that at least one object voxel is filled by one or more printing material(s) or that an object voxel is provided by the printing material(s). A size of the voxel can depend on a resolution of the printing process. The resolution of the printing process can e.g. be 300 dpi in a plane spanned by the x-direction and the y-direction and 600 dpi in the z-direction, wherein the directions x, y, z, provided Cartesian coordinate system. In the printing step, the voxel can thus be provided by the material assigned to the respective voxel, e.g. by a printing device.

The proposed embodiment advantageously allows an effective handling of the printing process in terms of speed required computing capacity.

In particular, an RGBA value can be assigned to each voxel. Such a RGBA value can be provided by texture-based input data. In this context, the parameters RGB can denote color values of a RGB space, wherein the parameter A denotes a translucency parameter which provides translucency information.

Assigning a color and translucency information to each voxel advantageously allows to provide a translucency information throughout the volume of the object, i.e. at every voxel.

In another embodiment, the determination of the voxel-based representation includes at least the steps of
  testing if a voxel is intersected by a surface of the printing object or at least one sub-object of the printing object,
  assigning a desired color value and desired translucency information to the voxel if the voxel is intersected by the surface.

A printing object can comprise multiple sub-objects. A sub-object can be at least partially arranged within the printing object, i.e. within its volume. If the printing object is for example a head, a sub-object can e.g. represent an eye or the brain.

A sub-object can correspond to a part of the printing object for which a distinct texture or material appearance property set is used, for example when multiple textures or material appearance sets are specified for the printing object. Additionally or alternatively, a sub-object may correspond to a separate geometric entity with a particular position, orientation and scaling with respect to another object or sub-object, for example an eye or brain geometry with respect to a head or skull geometry. Printing objects or sub-objects with different appearance (color and translucency) properties and be arranged so that they overlap or one or more is nested or embedded within another.

As mentioned before, the color value and translucency information which is assigned to a surface voxel, i.e. the voxel which is intersected by the surface, can be determined as a function of a texture- and shape-based representation of the printing object or of the sub-object. In other words, the texture- and shape-based representation of the printing object is mapped onto the surface voxel set of the printing object.

Such a technique advantageously allows a complex arrangement of objects within the printing volume of a printing device.

Further, an object identifier can be assigned to voxel if the voxel is intersected by a surface of said object. In particular, a sub-object identifier can be assigned to the voxel if the voxel is intersected by a surface of said sub-object of the printing object. Further, the desired color value and the desired translucency information and or the (sub-) object identifier can only be assigned to a voxel if no (sub-) object identifier is assigned to the voxel yet. In other words, an object-specific color and translucency information and/or an identifier is only assigned to voxel if it is not a voxel of another (sub-) object yet.

In another embodiment, a surface section of the printing object or of the at least one sub-object is determined, e.g. selected. Said surface section can e.g. be determined based on the texture- and shape-based representation. In particular, the surface section can be a section with a given number of vertices as edge points. Preferably, the surface section can be a triangle. A triangle can e.g. be spanned between three vertices provided by a texture- and shape-based representation.

It is, however, possible that the surface section has another geometric shape. In particular, a surface section can have a shape such that every point in the surface section can be defined as a function of the vertices defining the boundary of the surface section.

Further, a voxel bounding box of the surface section is determined. The bounding box can e.g. be defined by two x, y, z points, wherein first point consists of the minimal voxel coordinates and the second point consists of the maximal voxel coordinates of the points of the surface section.

For each voxel of the voxel bounding box or selected voxels of the voxel bounding box, a surface intersection criterion is evaluated, wherein a voxel is intersected by the surface section and thus by the (sub-) object if the surface intersection criterion is fulfilled.

The surface intersection criterion can e.g. be fulfilled if a distance of the voxel centre to the supporting plane of the surface section is smaller than the predetermined threshold value. The predetermined threshold value can be determined based on a voxel dimension and the direction of the normal vector of the surface section plane. If the surface section plane is e.g. parallel to x, y-plane and its normal vector points into z direction, the predetermined threshold can be provided by the resolution of the voxel in z direction.

In addition, the surface intersection criterion can be fulfilled if the voxel centre projects into the area of the surface section, e.g. into the area of the triangle. It is e.g. possible to project the voxel centre into the supporting plane of the surface section, e.g. using information on the normal vector of the supporting plane. Then, barycentric coordinates of a projected voxel centre can be determined. The voxel centre can e.g. project into the surface section if all the barycentric coordinates of the projected voxel centre are non-negative or if the barycentric coordinates are negative but greater than a predetermined threshold which is less than or equal to zero in order to account for numerical errors, etc. In particular, the predetermined threshold can be fixed to some arbitrary value less than or equal to zero, or it can be determined in such a way as to adapt to the size of the triangle using the area of the triangle and the lengths of the corresponding edge of the triangle. That is, all barycentric coordinates should be greater than or equal to this threshold, which is less than or equal to zero.

Alternatively, the surface intersection criterion can be fulfilled if the voxel centre projects into an area outside the surface section, e.g. outside the triangle area, but the surface section intersects the voxel volume.

Alternatively, two of the three principal axes of the voxel bounding box can be selected. The principal axes can be provided by the x-axis, the y-axis and the z-axis. These principal axes can be selected arbitrarily, e.g. the x- and y-axes, or based on the geometry and/or orientation of the surface section. The selected axes can e.g. be selected from the set of principal axes such that a deviation of parallelism of the plane spanned by the selected axes and the plane in which the surface section is arranged is minimal. For example, when the surface section is a triangle, the principal axes can be selected such that the plane spanned by principal axes best aligns with the supporting plane of the triangle. Further, the principal axes can be selected as a function of the magnitude of the components of the normal vector of the surface section. In particular, the principal axes can be selected as the axes to which the smallest components of said normal vector correspond. Other ways of selection are possible for surface sections with another shape and/or orientation.

It is then possible for each pair of voxel coordinates of the voxel bounding box referring to these two selected principal axes, to determine if a voxel centre with the respective voxel coordinates projects into the surface section if projected along the remaining principal axis. It is e.g. possible to determine a point of intersection of a line extending parallel to the remaining principal axis and intersecting the voxel centre with the respective voxel coordinates with a plane in which the surface section is arranged. For example, for a triangle surface section, given the two coordinates, it is possible to determine the third coordinate by inserting the first two coordinates into the plane equation of the supporting plane of the triangle. Similar algebraic solutions are possible for other types of surface section primitives.

The voxel center projects into the surface section if the point of intersection is inside the surface section. The point of intersection can e.g. in the case of a planar polygonal surface section, be inside the surface section if all barycentric coordinates of the point of intersection, with respect to the surface section, are greater than or equal to a threshold which is less than or equal to zero.

The surface criterion can then be fulfilled for a voxel with the respective pair of voxel coordinates referring to the two selected principal axes which has the smallest distance between the voxel center and the point of intersection.

This avoids the need to test all voxels in the voxel bounding box for intersection with the supporting plane of the triangle.

This advantageously allows a computationally efficient and therefore fast determination of voxels of the surface voxel set and thus an assignment of a desired color and translucency information to said surface voxels.

It is possible that the color value and translucency information which is assigned to the voxel can be determined by interpolation using texture image coordinates at the appropriate location, e.g. a location within the intersecting surface section. It is e.g. possible to determine a scale between the texture space and the build space. The texture space can e.g. denote the domain of the texture image which is usually normalized to $[0, 1] \times [0, 1]$. The build space can e.g. denote the space in which the voxel-based representation is provided. The scale can e.g. be provided as a scaling parameter. It is e.g. possible to scale down a high-resolution texture space representation into a lower resolution texture space representation which corresponds to a desired build space resolution. This advantageously avoids aliasing and Moiré artefacts when re-sampling the RGBA signal from texture space at lower effective resolution in build space.

It is also possible to determine the location of the projected centre of the voxel. Further, the desired color value and translucency information of the voxel can e.g. be determined as the color value and translucency information of the projected point or as a result of an interpolation using the color value and translucency information of the nearest object points of the texture- and shape-based representation, e.g. the nearest vertices, more particular the vertices providing the edge points of the surface section. Instead of the centre point of the voxel, it is also possible to use the nearest point to the voxel centre to determine the desired color value and translucency information.

In another embodiment, an object prioritization is performed if multiple printing objects are provided. In this case, multiple printing objects can be provided by the input data. Multiple printing objects are e.g. provided if the input data encodes color and translucency information of multiple printing objects. In this context, a printing object can also be a sub-object of one printing object.

Further, the voxel-based representation is determined for each object according to a priority-sorted sequence of the objects. In the sequence, objects can be sorted according to their priority in a descending order. In particular, the voxels-based representation can be determined first for the object with the highest priority.

Multiple objects can e.g. be determined from input data which encodes multiple geometries, wherein each geometry can e.g. provided by a texture- and shape-based representation, e.g. a set of vertices and a texture image assigned to the respective vertices.

It is further possible to perform a prioritization of all printing objects, whether or not they are sub-objects of a printing object. In this case, it is also possible to prioritize distinct printing objects, wherein these distinct printing objects do not necessarily have to have sub-objects. It is possible that the user is given the ability to arrange such distinct printing objects in such a way that they are overlapping or one is located inside the other in the build space. It is, however, also possible to provide the printing objects separately and to combine these printing objects in one single input data file.

Before the prioritization, the hierarchy can be flattened. The hierarchy can be represented by a graph (called scene graph) as known to the skilled person. This flattening can e.g. involve concatenating the relative transforms such that each sub-geometry has a transformation directly to the build space (voxel space) and removing place holder nodes in the graph which do not contain geometries themselves. The prioritization can e.g. be performed before starting the determination of the voxel-based representation.

It is further possible that a priority which assigned to an object is determined as a function of the volume of said object. In particular, a priority can be proportional to the reciprocal of the sub-object volume. It is further possible that the priority can be assigned by a user manually.

Such a prioritization advantageously allows to improve the color and translucency reproduction as voxels which are part of the voxel-based representation of multiple objects are unambiguously assigned to one object.

Further, it is possible to determine for each printing object or sub-object, object voxels and object exterior voxels (voxel classification). Object voxels can denote voxels which are intersected by a surface of said object or which are arranged inside the object. Exterior voxels denote voxels outside the surface of the object.

It is theoretically possible that a bounding box is determined for the object, wherein for each voxel of the bounding box it is tested if the voxel is an object voxel or outside the object. To test if the voxel is an object voxel or outside the object surface, pre-known testing methods can be applied. In particular, testing can be performed by using the generalized winding number method. Said method is e.g. described in the document "Jacobson et. al., Robust inside-outside segmentation using generalized winding numbers, ACM Transaction in Graphics (Proc. SIGGRAPH) 32, 4, 2013". If a voxel is classified as a voxel of a (sub-) object, the corresponding (sub-) object identifier can be assigned to the voxel. Said classification can e.g. be performed after the voxel-based representation of the printing object has been determined.

The test can be performed voxel-by-voxel. It is further possible to use a flooding approach in order to perform said classification.

In this case it is also possible that, if a voxel under consideration is classified as an object voxel, e.g. by applying a testing method, a neighbouring voxel of the voxel under consideration is classified as object voxels if the neighbouring voxel is not a surface voxel and if no (sub-) object identifier is assigned to said neighbouring voxel yet (flooding criteria). In other words, neighbouring voxels can provide flooding candidate voxels for which the flooding criteria can be evaluated.

Then, the flooding criteria can be evaluated for all flooding candidate voxels and the resulting classification can be performed. The process ends if no flooding candidate voxel can be found any more. This advantageously allows a computationally efficient and therefore fast determination of voxels inside this (sub-) object and an assignment of an object identifier there too.

In another embodiment, a surface layer voxel set and an interior voxel set are determined. Further, a color value and translucency information is assigned to each surface voxel, i.e. voxel of the surface layer voxel set. Further, a color value and a translucency information is assigned to each voxel of the interior voxel set. The assignments can be performed independently of each other. Alternatively, the assignment of a color value and a translucency information to an interior voxel can be based on the assignment of a color value and a translucency information to the surface voxels.

The interior voxel set can comprise all interior voxels. The interior voxel set can be a near-surface interior voxel set which comprises only voxels of a near-surface interior region and thus not all interior voxels of the printing object. The near-surface interior voxel set can be a sub set of all interior voxels.

In other words, the voxel-based representation of the printing object or the sub-object is split up into at least two voxel sets, wherein the assignment of a color value and translucency information to voxels of different voxel sets can be performed independently.

Preferably, for each voxel of the interior voxel set, the color value and the translucency information of its nearest surface voxel or of a nearest point of a (predetermined) point set can be assigned. In particular, for each voxel of the near-surface interior voxel set, the color and the translucency information of its nearest surface voxel or the nearest point of said point set can be assigned. A preferred determination of the nearest surface voxel or nearest point of a point set will be explained later.

Alternatively to assigning the color value and/or the translucency value from the nearest surface voxel, an average value of the k nearest surface voxels can be assigned to the interior voxel or a natural nearest surface voxel interpolation or window-based filtering schemes can be used to assign a color and/or a translucency value to the interior voxel.

The nearest surface voxel can denote the voxel which is the closest surface voxel to the respective voxel of the interior voxel set. In other words, a distance according to a predetermined distance metric from the respective interior voxel to its nearest surface voxel is smaller than or equal to the distances from the respective voxel to all other surface voxels.

If more than one surface voxel qualifies as nearest surface voxel, a tie-breaking algorithm can be applied in order to determine the nearest surface voxel from the set of nearest surface voxel candidates. It is e.g. possible to select the color and translucency information of the nearest surface voxel with the highest translucency. Other tie-breaking criteria are, however, possible. Alternatively, an average color value and translucency information can be determined from all nearest surface voxel candidates. In this case, the average color value and translucency information can be assigned to respective interior voxel. Further alternatively, it is possible that the voxel which was determined first as nearest surface voxel is selected as nearest surface voxel.

This advantageously allows a computationally effective and fast assignment of color values and translucency information to interior voxels in order to provide a desired color and translucency reproduction.

In a preferred embodiment, at least for each voxel of a near-surface interior voxel set, the color value and the translucency information of its nearest surface voxel is assigned. Alternatively, least for each voxel of a near-surface interior voxel set, the color value and the translucency information of the nearest point of a point set is assigned. Said point set can be a predetermined point set and can be different from the point set provided by the surface layer voxel set. Exemplary point sets will be described later.

Further, for each voxel of a set of at least one, preferably of all, remaining interior voxel(s), the color value of a preset color and the translucency information of its nearest surface voxel set is assigned. Alternatively, for each voxel of a set of at least one, preferably of all, remaining interior voxel(s), the color value of a preset color and the translucency information of the nearest point of said point set is assigned.

The preset color is preferably a white color. Alternatively, the preset color can be chosen from a set of multiple preset color values, e.g. a set comprising a white color and/or a grey color and/or a blue color.

A near-surface interior voxel set can comprise all voxels for which a distance to the nearest surface voxel is smaller than a predetermined threshold distance or for which a distance to the nearest surface voxel is within a predetermined distance range.

In other words, the color value and translucency information of the nearest surface voxel or of the nearest point of a (predetermined) point set is only assigned to a sub set of all interior voxels, namely to all voxels of the near-surface interior voxel set, wherein the translucency information of the nearest surface voxel or nearest point of the point set is assigned to all interior voxels.

This advantageously provides a better computationally performance of the proposed method as computational time and memory requirements are reduced because the halftoning and layer extraction is only performed for the near-surface voxel set, wherein translucency and color adjustment for the remaining interior voxels can be performed using alternative assignments.

In another embodiment, the nearest surface voxel of an interior voxel is determined by applying a two-step process. Alternatively, the nearest point which is a point of a point set, in particular a predetermined point set, of the interior voxel is determined by applying the two-step process.

In the following, the determination of the nearest surface voxel will be described. The same method, however, can be used for the determination of the nearest point of said point set, wherein the point set is used instead of the surface voxel set.

In a first step, for each voxel of/within a selected x, y-slice, the z-distance (distance along the z axis) to the nearest surface voxel with the same x, y coordinates is determined. In particular, a x,y-slice is selected beforehand. The nearest surface voxel with the same x,y coordinates can e.g. be a voxel of the aforementioned surface layer voxel set.

In a further step, a 2D distance transformation, i.e. a distance transformation of a 2D function, is used to determine the nearest surface voxel for each voxel of the selected x, y-slice. A distance transformation of a 2D function is known to the skilled person. In this case, the 2D function to which the distance transformation is applied is the aforementioned z-distance to the nearest surface voxel with the same x, y-coordinates of each voxel in the x,y-slice. In other words, said z-distance provides the 2D function.

The determination of the nearest surface voxel can be performed for each voxel of each x,y-slice, in particular slice by slice.

The 2D distance transformation can e.g. denote an operation which determines, for a selected voxel of the x, y-slice, the surface voxel which minimizes the sum of the z-distance (distance in z direction) of said surface voxel to the x, y-slice and the distance between the x, y-coordinates of said surface voxel and the selected voxel. Such a distance transformation can e.g. be provided by the algorithm described in the document "Felzenszwalb, P. and Huttenlocher, D., Distance Transforms of Sampled Functions, Theory of Computing, vol. 8, pp. 415-428, 2012."

The surface voxel set can e.g. be provided by the evaluation of the surface intersection criterion which has been explained before.

Instead of using the voxels of the surface voxel set, the point set (or voxel set) used for determining the nearest point can be provided by a point set which is constructed from the texture- and shape-based representation, wherein said point set extracted from the texture space is used in addition to assign translucency values to the deep interior voxel set. In other words, determination of the translucency values of (deep) interior voxels is not mandatorily based on the aforementioned surface layer voxel set but is based on an alternative point set instead of the surface layer voxel set.

The point set which is extracted from the texture space can e.g. be determined based on a frequency of the translucency signal in the texture space. In particular, the point set can be provided such that the translucency information in the textures space is provided with a minimal amount of points (samples), or with a fixed predetermined number of points (samples), which are evenly distributed over the surface of the printing object. It is further possible to apply an importance sampling in texture space, by which samples are selected according to an importance function or sample density function. In particular, a higher sample density can be provided in surface regions in which a function value of the sample density function is higher than in surface regions in which the function value of the sample density function is lower. Importance sampling is known to the skilled person.

A function value of the importance or sample density function can be determined from a number of quantities and/or a combination thereof. For example, the function value of the sample density can be a function of the surface area occupied on the printing object by the region in texture space, or by features of the translucency signal in texture space, such as the gradient of the translucency signal in texture space, or a combination thereof. This advantageously allows points (voxels) to be distributed evenly over the surface area of the printing object, with additional points placed at locations where the translucency signal changes rapidly.

Alternatively to assigning the color value and/or the translucency value from the nearest surface voxel, an average value of the k nearest neighbor voxels can be assigned to the interior voxel or a natural nearest neighbor voxel interpolation or window-based filtering schemes can be used to assign a translucency value to the interior voxel.

Using a 2D distance transformation advantageously allows a computationally very efficient, e.g. fast, determination of the nearest surface voxel. The efficient computation is inter alia enabled due to a constant computational time per voxel and a memory consumption in line with a streaming model of computation, of both, namely of the distance to the nearest surface voxel and of the transfer of attributes form the nearest surface voxel to interior voxels of arbitrary distance from the surface. Further, the required computational time and memory is independent of the maximum distance to the surface.

Preferably, a voxel array can be assigned to each x, y-coordinate of object voxels, wherein the x, y-coordinate is the x, y-coordinate of at least one object voxel. Further, each surface voxel can be mapped into the voxel array which is assigned to x,y-coordinates corresponding to the x, y-coordinate of said surface voxel.

Further, the surface voxels within one array can be sorted according to the z-coordinate in an ascending order. Further, the z distance to a x, y-slice can then be determined depending on the (sorted) voxel array. The voxel arrays which are determined in the aforementioned way advantageously allow a very fast computation of the closest surface voxel in said direction for each voxel in a x, y slice.

It is further possible that the determination of the nearest surface voxel for an interior voxel is performed slice by slice with an ascending z coordinate of the subsequent slices. In this case, an array index can be assigned to each x, y coordinate. Further, the distance of an interior voxel of the selected slice to its nearest surface voxel in z-direction can be determined index-dependent, e.g. as the distance to the voxel of the array with the current index assigned to the respective x,y-coordinates.

The index can be incremented if the z-distance of the selected interior voxel to the array voxel with the current index is larger than or equal to the z distance of the selected interior voxel to the array voxel with an incremented index. It is, for instance, possible to initialize the index which is assigned to a x, y-coordinate with an index value representing the first entry of the afore mentioned voxel arrays. In this case, the z-distance of the voxels in the first x, y-slice (the x, y slice with the smallest z value) is assumed to be the distance to the surface voxel which corresponds to the first entry in the voxel array which is assigned to x,y-coordinates corresponding to x,y-coordinates of the voxel under consideration. This advantageously allows a computationally efficient determination of the z-distance.

The proposed determination of the nearest surface voxel or the nearest point of a (predetermined) point set of an interior voxel of a set of interior voxels by applying a two-step process can be subject of an independent invention. It can be performed independent of using transparent and non-transparent printing materials to construct a printing object. Thus, a method and a device for determining a nearest surface voxel, or a nearest point of a point set, of an interior voxel of voxel-based representation of an object, in particular, a printing object is described.

It is possible to determine a surface voxel set or a point set and an interior voxel set of the voxel-based representation. This has been explained before. Then, the nearest surface voxel of at least one, selected but not all or all interior voxel(s) is/are determined by applying the aforementioned two-step process. Further embodiments of the described method and device can have the features or aspects as described in this disclosure and related to the aforementioned two-step process.

Preferably, a color value information from a perceptually non-uniform color space and a translucency information from a perceptually non-uniform translucency space are assigned to each voxel wherein said color value information is transformed into a color value information within a perceptually uniform color space or quasi perceptually uniform color space. Further, the said translucency information is transformed into a translucency information within a perceptually uniform translucency space or quasi perceptually uniform translucency space. A perceptually uniform color space or translucency space denotes a space in which two pairs of color values or translucency values with equal numerical distances (e.g. Euclidean metric) have also the same perceptual differences. A perceptually non-uniform color space or translucency space denotes a space in which two pairs of color values or translucency values with equal numerical distances, e.g. Euclidean metric, have different perceptual differences. Perceptual differences can be measured by experiments. Such experiments are well known to the skilled person.

For color differences, two psychophysical methods are usually used: the so-called "Method of constant stimuli" and the so-called "Gray scale method". These methods are e.g. described in the document Montag, Ethan D., and David C. Wilber. "A comparison of constant stimuli and gray-scale methods of color difference scaling." Color Research & Application 28.1 (2003): 36-44. These methods can also be used to measure perceptual difference in a color and translucency space.

In other words, perceptual-uniformity can mean that Euclidean distances in this space agree well with perceived distances obtained by said experiments, in particular psychophysical experiments, more particular experiments where human users have to subjectively judge differences between the color and translucency of test samples. Note that since human color vision is not Euclidean, a theoretically perfect perceptually-uniform space cannot exist and only an approximation is possible. Such an approximation can also be referred to as quasi-perceptually-uniform space, wherein said approximation minimizes the deviation between computed distances in the space (e.g. Euclidean distances) and perceptual distances. This is e.g. described in the documents Urban, P., Rosen, M. R., Berns, R. S., & Schleicher, D. (2007), "Embedding non-Euclidean color spaces into Euclidean color spaces with minimal isometric disagreement." JOSA A, 24(6), 1516-1528, and Lissner, I. and Urban P., "Upgrading color-difference formulas." JOSA A 27.7 (2010): 1620-1629.

It is e.g. possible to transform the RGB component of the aforementioned RGBA vector into a so-called CIELAB component of a CIELABβ vector. In this notation, CIELAB can denote a color information in the CIELAB space and β can denote a translucency parameter within a perceptually (quasi) uniform translucency space. Further, RGB can denote a color information in the RGB space and A can denote a translucency parameter within a perceptually non-uniform translucency space.

The transformation from a perceptually non-uniform color space into a perceptually uniform color space and from a perceptually non-uniform translucency space into a perceptually uniform translucency space therefore describes the relationship between two color and translucency spaces, whereas a perceptually or quasi-perceptually uniform space, e.g. the CIELABβ space, is not less perceptually uniform than the perceptually non-uniform space, e.g. the RGBA space. The said spaces can be device-independent spaces. The color transformation from a RGB color space (e.g. sRGB, Adobe RGB, ECI RGB, etc.) to CIELAB is defined and known to the skilled person.

A transformation from the A translucency space to the β translucency space can denote a transformation by which the translucency values of the A translucency space are transformed into values of the β translucency space such that the average deviation between the numerical distance (e.g. Euclidean distance) of any pair of translucency values and its corresponding perceptual translucency difference determined by psychophysical experiments is smaller in the β translucency space as in the A translucency space. Herein, the numerical distance as well as the perceptual translucency difference are numerical values representing the translucency difference. In the area of color spaces this is e.g. described in the document "Urban, P., Rosen, M. R., Berns, R. S., & Schleicher, D. (2007). Embedding non-Euclidean color spaces into Euclidean color spaces with minimal isometric disagreement. JOSA A, 24(6), 1516-1528".

To achieve said transformation result, different transformation schemes can be applied. One or more transformation(s) fulfilling the desired result can be found by the skilled person. Such a transformation can be defined using a functional relationship or by a lookup table.

The transformation from a perceptually non-uniform space into a perceptually uniform space is, however, not an absolutely required step of the proposed method. It is, for instance, possible that the transformation from the A translucency space to the β translucency space can be a simple identity transformation, e.g. the translucency values in the β translucency space can equal the translucency values in the A translucency space or can be proportional to said translucency values, in particular if the RGBA color and translucency space is perceptually uniform with respect to the translucency parameter A (but perceptually non-uniform with respect to the RGB components).

A detailed definition of a translucency parameter A of a nearly-perceptually uniform space is given in Philipp Urban, Tejas Madan Tanksale, Alan Brunton, Bui Minh Vu, Shigeki Nakauchi, "Redefining A in RGBA: Towards a Standard for Graphical 3D Printing, Submitted to ACM Transaction on Graphics." A preprint is already published at arXiv: https://arxiv.org/abs/1710.00546".

The transformation of the color value information and the transformation of translucency information can be performed independently from each other, e.g. for the color component and for the translucency component. Alternatively, the transformation can be a combined transformation by which color and translucency information of the perceptually non-uniform space are transformed into a color and translucency within the quasi-perceptually uniform space in a single transformation process. It is possible that the transformation from a perceptually non-uniform color and translucency space, e.g. the RGBA space, into a perceptually uniform color and translucency space, e.g. the CIELABβ space, is provided by a functional relationship or by a lookup table.

The transformation into the perceptually uniform space advantageously allows to use the Euclidean metric (that reflects in a perceptually uniform space perceptual differences) for perceptually relevant distance evaluations employed e.g. in gamut specification and mapping, as cost function in optimizations (e.g. lookup table generation), process control or quality assurance.

In another embodiment, the color value and the translucency information which is assigned to one voxel is transformed into a printer-specific printing material color and translucency vector.

In a preferred embodiment, the translucency component (or parameter) of the printer-specific printing material color and translucency vector is adapted as a function of light transport effects. In particular, it is possible to assign a result of a first operation to the translucency component, e.g. the translucency parameter, of the printer-specific printing material color and translucency vector assigned to a selected voxel if a distance of the selected voxel from the nearest surface voxel is smaller than a predetermined threshold value.

If the distance is equal to or higher than the predetermined threshold value, the result of a second operation can be assigned to the value of the translucency component of the printer-specific printing material color and translucency vector.

The first operation can e.g. be a division of a minimum value of the set comprising a preset value and the unadapted translucency component by said preset value, e.g. min (t, γ)/t, wherein t denotes the preset value.

The second operation can e.g. be a division of the maximum from the set comprising 0 and the difference between the unadapted translucency parameter and the preset value by the difference between one and the preset value, e.g. max (0, γ−t)/(1−t).

The preset value can be selected from the same range as the value range of the translucency component or parameter, in particular from the range of 0 (inclusive) to 1 (inclusive), wherein t is preferably selected from the interval of 0.3 to 0.7, more preferably as 0.5.

As will be explained later, the proposed adaption advantageously allows to increase lateral light transport for small values of γ resulting in blurring high frequency texture details, which aids perceptual cues for translucency of turbid media. Since the interior non-near surface voxels can remain e.g. white, achieving high color accuracy is less dependent on the geometry of the object. For high values of γ, vertical light transport dominates and the contrast increases again in the optically thin range. The proposed adoption can increase the perceived translucency gamut.

In another embodiment, the printer-specific printing material color and translucency vector is determined based on a predetermined assignment of color value and translucency information to printer-specific printing material color and translucency vectors.

In particular, the assignment can be an assignment of a color value and a translucency information within the perceptually uniform color-translucency space, e.g. from CIELABβ vectors, to printer-specific printing material color and translucency vectors, e.g. to CMYKγ vectors. Said assignment or transformation can describe the relationship between a device-independent CIELABβ representation of color and translucency values and the ratio of printing materials, e.g. CMYK values and a γ value. The γ value can represent a ratio between white and clear, wherein clear denotes a nearly fully transparent material, i.e. with almost zero absorption and scattering. CMYK values and the γ value are required to reproduce the desired color and translucency values.

One possible approach to determine said transformation is to obtain one or multiple training prints using specified CMYKγ values. Then, color and translucency information of these training prints are measured to obtain color and translucency values, e.g. in the CIELABβ space. Further, a physical or empirical model can be fitted to these measurements to obtain the predicting function that maps CMYKγ values to CIELABβ values. An empirical model could e.g. be a simple interpolation between the training samples.

In a further step, said predicting function, which can also be referred to as forward printer model, is inverted to obtain the CMYKγ values required to reproduce a given CIELABβ input. The inverted predicting function provides the desired assignment of a color value and a translucency information within the quasi-perceptually uniform color-translucency space, e.g. from CIELABβ vectors, to printer-specific printing material color and translucency vectors, e.g. to CMYKγ vectors.

It is possible that said transformation is not surjective, e.g. some CIELABβ values cannot physically be reproduced by the printer. In this case, a so-called gamut mapping transformation can be used to map all possible CIELABβ values into the reproducible (printable) CIELABβ values which are values of a set of CIELABβ values reproducible by the respective printing device. Then the predicting function is inverted to obtain the CMYKγ values for a given reproducible CIELABβ value.

It is further possible that multiple CMYKγ values yield the same CIELABβ value. In this case different strategies can be applied to select only one CMYKγ value from the set of said multiple CMYKγ values, e.g. the one with the maximum percentage of the black ink. This can also be referred to as "Gray Component Replacement" which is known to the skilled person. Also other strategies can be applied, e.g. the so-called "Under Color Removal".

The transformation from the CIELABβ space into the CMYKγ space or the combined transformation of the transformations from the CIELABβ space into the reproducible CIELABβ space and from said reproducible CIELABβ to the CMYKγ space can be determined once and then be stored in a memory unit, e.g. in form of a lookup-table. This (combined) transformation can e.g. be included in a so called "profile" (similar as in the color management standard of the International Color Consortium (ICC)) and evaluated for each print.

In general terms, the transformation from the CIELABβ space into the CMYKγ space denotes a transformation from a device-independent space, here CIELABβ space, into a device control space, here the CMYKγ space. Such transformations are generally known to the skilled person. Details of such a transformation, e.g. the forward printer model or the gamut mapping transformation, are usually a corporate secret.

Alternatively, the assignment can be an assignment of a color value and a translucency information within a perceptually non-uniform color-translucency space, e.g. from RGBA vectors, to printer-specific printing material color and translucency vectors, e.g. to CMYKγ vectors, e.g. without transforming the color value and a translucency information within a perceptually non-uniform color-translucency space into a color value and a translucency information within a quasi-perceptually uniform color-translucency space.

The assignment can be provided by a mapping of multiple, but not all, color value and translucency information within a color-translucency space, e.g. a perceptually non-uniform or a perceptually uniform color-translucency space, to printer-specific printing material color and translucency vectors. It is possible that multiple different color value and translucency information are mapped to the same printer-specific printing material color and translucency vector. Typically, however, different color value and translucency information are mapped to different printer-specific printing material color and translucency vectors.

Further, for elements (nodes) of the color-translucency space to which no printer-specific printing material color and translucency vector is assigned, the respective printer-specific printing material color and translucency vector can be determined by interpolating between printer-specific printing material color and translucency vectors assigned to elements (nodes) to which a printer-specific printing material color and translucency vector is assigned. The interpolation can e.g. be performed by using a multi linear interpolation.

The assignment of a printer-specific material color and translucency vector to color values and translucency information can e.g. be provided by a look up table. The resulting assignment can be invertible.

The predetermined assignment can preferably be determined by
  sampling a color-translucency space into a selected number of nodes,
  mapping the color component (i.e. color value) of each node into a mapped color component (mapped color value) of a reference set of printable colors,
  determining node-specific sets of printer-specific printing material color and translucency vectors by using a printer predicting function,
  from each node-specific set select one printer-specific printing material color and translucency vector, in particular the printer-specific printing material color and translucency vector which minimizes the difference between the translucency information of the node and the translucency information determined by applying the printer predicting function on each printer-specific printing material color and translucency vector of the said node-specific set,
  assign the selected printer-specific printing material color and translucency vector to said node.

A node in the color-translucency space can be defined by a color value and a translucency information.

The color component can correspond to the color value(s) or color-related components of the color value and translucency information. Correspondingly, the translucency component can correspond to the translucency value(s) or translucency-related components of the color value and translucency information.

Mapping the color component of each node into a mapped color component of a reference set of printable colors can also be referred to as gamut mapping which is known to the skilled person.

A printer predicting function allows predicting of the color value and the translucency information of the printed output, in particular in a desired color-translucency space, for a given printing material color and translucency vector.

Each node of the color-translucency space can have a color and a translucency component. A node-specific set of printer-specific printing material color and translucency vectors can comprise at least one, preferably multiple, printer-specific printing material color and translucency vectors.

The reference set of printable colors can denote a reference set of printable colors with a predefined translucency, preferably an opaque translucency. In other words, the reference set of printable colors can be provided by a color gamut defined by the set of color values obtained by applying the printer predicting function to all printer-specific printing material color and translucency vectors with the same translucency component. Preferably, the translucency component corresponds to zero (opaque translucency). In this case, the corresponding color gamut is an opaque color gamut. The reference set of printable colors denotes the set of colors which is printable by the printing device for which the printer-specific printing material color and translucency vector is determined.

The determination of node-specific sets of printer-specific printing material color and translucencies vectors by using the printer prediction function can e.g. be performed by transforming printer-specific material color and translucency vectors into the printable sub space provided by the reference set of printable colors using the printer predicting function. In this case, a printer-specific printing material color and translucency vector can be assigned to a node if a difference between the transformed color component and the node-specific mapped color component is smaller than a predefined threshold value.

Alternatively, the node-specific sets of printer-specific printing material color and translucency vectors can be determined by using an inverse of the printer predicting function. In this case, the color and translucency component of the node can provide an input to the inverse, wherein the result is a set of one or more than one printer-specific printing material color and translucency vector(s) which provide the desired observation.

The result of the assignment is that to each node within the color-translucency space, e.g. the CIELAB$\beta$, one printer-specific printing material color and translucency vector is assigned. The assignment can be provided as a look-up table, wherein the entries correspond to the nodes and the respectively assigned printer-specific printing material and translucency vectors. An element within the color-translucency space which does not correspond to a node can be assigned to a printer-specific printing material color and translucency vector by interpolation between the printer-specific printing material color and translucency vectors of the closest nodes to said element.

Further, the determination of node-specific sets can be based of the step of transforming a set of printer-specific printing material color and translucency vectors into the reference set using at least a printer predicting function which predicts a color value and a translucency information of the printed output for a given printing material color and translucency vector.

In another embodiment, the assignment of a color value and translucency information to a printer-specific printing material color and translucency vector is performed using or applying the printer predicting function and a gamut correction function. The printer predicting function has been explained before. In particular, the gamut correction function is applied after the application of the printer predicting function, e.g. after the printer-specific printing material color and translucency vector is transformed into the color-translucency space. By applying the gamut correction function, it is ensured, that a printer-specific printing material color and translucency vector can be assigned to each color in the reference set of printable colors, wherein the printer-specific printing material color and translucency vector reproduces the desired color and translucency.

In particular, a printer-specific printing material color and translucency vector can be assigned to a selected color "COL" in the reference set of printable colors such that the color which is reproduced after the gamut correction function is applied matches the selected color "COL" or does not deviate more than a predetermined amount from said selected color "COL". Further, printer-specific printing material color and translucency vectors can be assigned to each color "COL" in the reference set of printable colors such that the set of all printer-specific printing material color and translucency vectors assigned to the selected color "COL" contains a printer-specific printing material color and translucency vector with any desired printer-specific translucency-related entry.

Using the gamut correction function advantageously allows to compensate the fact that a specific printer is usually not able to print every color in the reference set of printable colors with any desired translucency component. By applying the gamut correction function, printer-specific color and translucency vectors can be assigned to non-printable color-translucency combinations with color values within the reference set of printable colors.

A result of the gamut correction function is that a lightness error between a desired lightness and the lightness of the printing object is minimized. Herein, lightness can be defined as the brightness relative to the brightness of the white color of the reference set of printable colors which can also be referred to as media relative white point. Further, hue preserving might be ensured by the gamut correction function.

Preferably, the transformation of a printer-specific printing material color and translucency vector into the reference set of printable colors can be performed by applying the printer prediction function followed by the application of the gamut correction function. The gamut correction function can be determined such that each printing material color and translucency vector, in particular for different translucency levels, is mapped into the reference set of the printable colors. As a result, to each point of the reference set of printable colors, a point in all other gamuts, e.g. gamuts with a different translucency level, can be assigned.

Further, the assignment of a color value and translucency information to a printer-specific printing material color and translucency vector can be smoothed. This advantageously avoids color and translucency banding artifacts in the printing object. Further, for high translucency levels, the lightness for bright colors can be mapped towards the white point which reduces lightness deviations between translucency levels. Further, a lightness contrast is reduced which, in turn, enhances a translucency cue.

Smoothing further ensures artefact-free reproductions of color and translucency transitions in textures. Smoothing can e.g. be performed by determining a vector-specific mean value for each printer-specific printing material color and translucency vector entry of the assignment. In this case, a mean value or a component-based median of all printer-specific printing material color vectors which are assigned to a predetermined set of neighbouring nodes in the color-translucency space can be determined and assigned to a selected node in the color-translucency space. Alternatively, for a selected node in the color-translucency space, a printer-specific printing material color vector can be selected from the node-specific set of printer-specific printing material color and translucency vectors which minimizes the difference to a mean or a component based median value of printer-specific printing material color and translucency vectors which are assigned to a selected set of neighbouring nodes.

In another embodiment, a voxel-based representation of the printing object is determined, wherein one of the printing materials, in particular one of the non-transparent printing materials, is assigned to each voxel, wherein the assignment of a printing material to a voxel is based on the desired color and translucency reproduction of the printing object.

The assignment of a specific printing material, in particular a non-transparent or a transparent printing material, to a voxel can be based on the printer-specific printing material color and translucency vector.

The assignment of a specific printing material to a voxel can be performed by applying a so-called error diffusion algorithm. Such an error diffusion algorithm has been described in EP 3023229 A1. This document is hereby fully incorporated by reference, in particular the features and aspects of the claims of said document and all features and aspects related to the error diffusion algorithm.

In particular, it is possible that a printing material color quantization is performed for each voxel, in particular for each voxel of the surface layer voxel set. The printing material color quantization can be performed for the color components of the printer-specific printing material color and translucency vector. For each printing material color, a minimal or maximal color value can be assigned to the respective voxel, wherein a color error value is distributed among voxels within a predetermined neighbourhood of the respective voxel. The assignment of a printing material to the respective voxel is based on a set of quantized printing material colors.

Further, the assignment of a printing material to a voxel can be provided by applying a half-toning algorithm. Suitable half toning algorithms are known to the skilled person.

Preferably, a so-called layered half-toning can be performed which has been disclosed in EP 3023229 A1. Therefore, the features and aspects related to the layered half-toning algorithm disclosed in said document are incorporated by reference.

In this case, at least one interior layer voxel set of the printing object can be determined, wherein the distances of all voxels of the interior layer voxel set to the respective nearest surface voxel are within a predetermined distance interval of non-zero distances. Further, a printer-specific printing material color and translucency vector of the nearest surface voxel is assigned to each voxel of the interior layer voxel set. Further, an assignment of one of the printing materials to each voxel of the surface layer voxel set can be performed independently of an assignment of one of the printing materials to each voxel of the at least one interior layer voxel set. In particular, the assignment of one of the printing materials to each voxel of the surface layer voxel set can be provided by performing a half-toning algorithm depending only on voxels of the surfaces layer voxel set, wherein the assignment of one of the printing materials to each voxel of the at least one interior layer voxel set can be provided by performing a half-toning algorithm depending only on voxels of the same interior layer set. This advantageously allows a performance-effective processing of interior voxels.

Alternatively, a so-called nibbling half toning can be performed in order to assign a printing material to a voxel. The nibbling-half toning is also disclosed in the aforementioned EP 3023229 A1. Therefore, the features and aspects related to the nibbling half-toning algorithm disclosed in said document are incorporated by reference.

Further, a so-called contoning algorithm, in particular a sequence-based contoning or a probability contoning algorithm, can be performed in order to assign a printing material to a voxel. The contoning algorithm is disclosed in the aforementioned GB 1512434.0. Therefore, the features and aspects related to the contoning algorithm disclosed in said document are incorporated by reference.

In a preferred embodiment, an assignment of a non-transparent printing material to one voxel is replaced by an assignment of the at least one transparent printing material to said voxel as a function of the translucency information assigned to said voxel. In this context, the translucency information can be provided by the translucency component or translucency-related entry of the printer-specific printing material color and translucency vector assigned to said voxel.

Replacement can e.g. be performed if a replacement criterion is fulfilled. The replacement criterion can e.g. be fulfilled if the translucency information is higher than a predetermined threshold value.

Preferably, the replacement is performed probabilistically. In particular, a value within the value interval of the translucency information can be generated randomly.

In case that an increasing value of the translucency information denotes an increasing translucency, replacement is performed if the randomly generated value is smaller than the translucency information which is assigned to the voxel. If the randomly generated value is larger than or equal to the translucency parameter, replacement is not performed.

In case that an increasing value of the translucency information denotes a decreasing translucency, replacement is performed if the randomly generated value is higher than the translucency information which is assigned to the voxel. If the randomly generated value is smaller than or equal to the translucency parameter, replacement is not performed.

The replacement of a non-transparent printing material by a transparent printing material after a (non-transparent) printing material has been assigned to a voxel advantageously allows a computationally effective determination of printing control data, wherein the resulting printing object has a desired color and translucency reproduction.

In a preferred embodiment, the replacement is only performed for voxel to which a preset color printing material is assigned. The preset color printing material can e.g. be a white color printing material. It is, however, also possible to perform replacement only for a voxel to which a color printing material of a set of multiple preset printing materials is assigned. Said set can e.g. include a white color printing material, a grey color printing material and so on. This advantageously improves a computational performance. Further a blue noise pattern can be preserved. Finally, the printing process can be controlled as a function of the resulting assignment of printing materials to voxels.

Further described is a data processing system, in particular of or for a printing device, wherein the data processing system comprises means for the execution of a method for three-dimensional joint color and translucency printing according to one of the embodiments disclosed in this disclosure. The data processing system can e.g. comprise a control unit, e.g. provided by one or more microcontroller(s).

Further proposed is a computer program product with a computer program, wherein the computer program comprises software means for the execution of a method for three-dimensional joint color and translucency printing according to one of the embodiments disclosed in this disclosure, if the computer program is executed by or in an automation system, e.g. a control unit.

Further proposed is a program which, when running on a computer, causes the computer to perform one or more or all steps of a method for three-dimensional joint color and translucency printing according to one of the embodiments described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

This means that the method in accordance with the invention is for example a computer implemented method. For example, all the steps or merely some of the steps (i.e. less than the total number of steps) of the method in accordance with the invention can be executed by a computer. An embodiment of the computer implemented method is a use of the computer for performing a data processing method. The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right.

Further proposed is a 3D joint color and translucency printing device. The printing device comprises a means for printing at least a first non-transparent printing material with a first printing material color and a means for printing at least one transparent printing material. Further, the joint color and translucency printing device comprises at least one control unit. The means for printing the first non-transparent printing material is controlled/controllable such the first non-transparent printing material is used to construct the printing object, wherein the means for printing the at least one transparent printing material is controlled/controllable such that the at least one transparent printing material is used to construct the printing object.

Further, the means for printing the first non-transparent printing material and the at least one transparent printing material are controlled/controllable such that an arrangement of the printing materials is provided such that a desired color reproduction is provided.

According to the invention, the means for printing the first non-transparent printing material and the at least one transparent printing material are, in particular additionally, controlled/controllable such that an arrangement of the printing materials is provided such that a desired translucency reproduction of the printing object is provided.

The proposed printing device advantageously allows performing a method according to one of the embodiments disclosed in this disclosure. In particular, the printing device can comprise more than one, e.g. two or three, means for printing non-transparent printing materials with different colors and one means for printing a transparent printing material.

Further proposed is a printing object, wherein the printing object is obtained or obtainable or directly obtained by a method for three-dimensional joint color and translucency printing according to one of the embodiments disclosed in this disclosure. The printing object obtained by such a method possesses a unique and apparent color and translucency that is similar or close to the digital model(s) as specified with the RGBA texture(s). The core of the object(s) (distance beyond the near surface region) is made out of clear and white material. In particular, the printing materials of the core correspond to a CMYK vector of (0,0,0,0) or a CMYK vector in which the entries do not deviate from the zero value by more than a predetermined amount, e.g. by more than 1% or 5%, of the maximal value of an entry. A CMYK vector of (0, 0, 0, 0) means that no cyan, magenta, yellow or black is used to produce the core and can e.g. represent a clear or white material. A CMYK vector in which the entries do not deviate from the zero value by more than a predetermined amount, e.g. by more than 1% or 5%, of the maximal value of an entry can e.g. represent a nearly clear or nearly white material.

The core denotes the set of voxels for which the distance to the nearest surface voxel is higher than a predetermined threshold value. This threshold value is e.g. chosen as the smallest distance to the surface for which the color gamut volume is maximized if the arrangement of color materials, e.g. defined by CMYK vectors, is restricted to the near surface region. In other words, printing materials defined by CMYK values or vectors are placed only up to this smallest distance from the surface and not in the core. This is described in Brunton, Alan, Can Ates Arikan, and Philipp Urban, "Pushing the limits of 3d color printing: Error diffusion with translucent materials." ACM Transactions on Graphics (TOG) 35.1 (2015): 4.

If the printing object is cut through, a centre portion or volume of the printing object consists exclusively of clear or white material or of nearly clear or nearly white material (and thus not of colored materials different from clear or white material), wherein the remaining surface portion or volume of the printing object consists of colored materials and/or white material and/or clear material.

BRIEF DESCRIPTION OF THE DRAWING FIGURES

Figure 2:
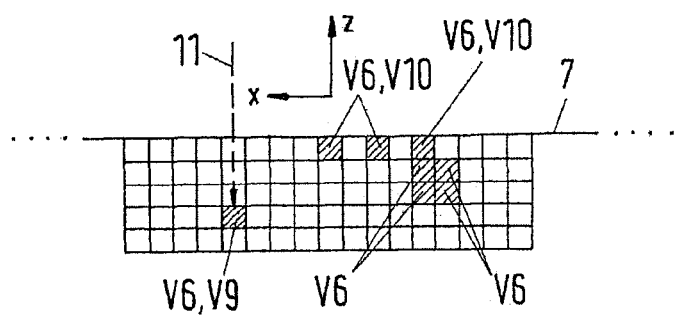
Figure 3:
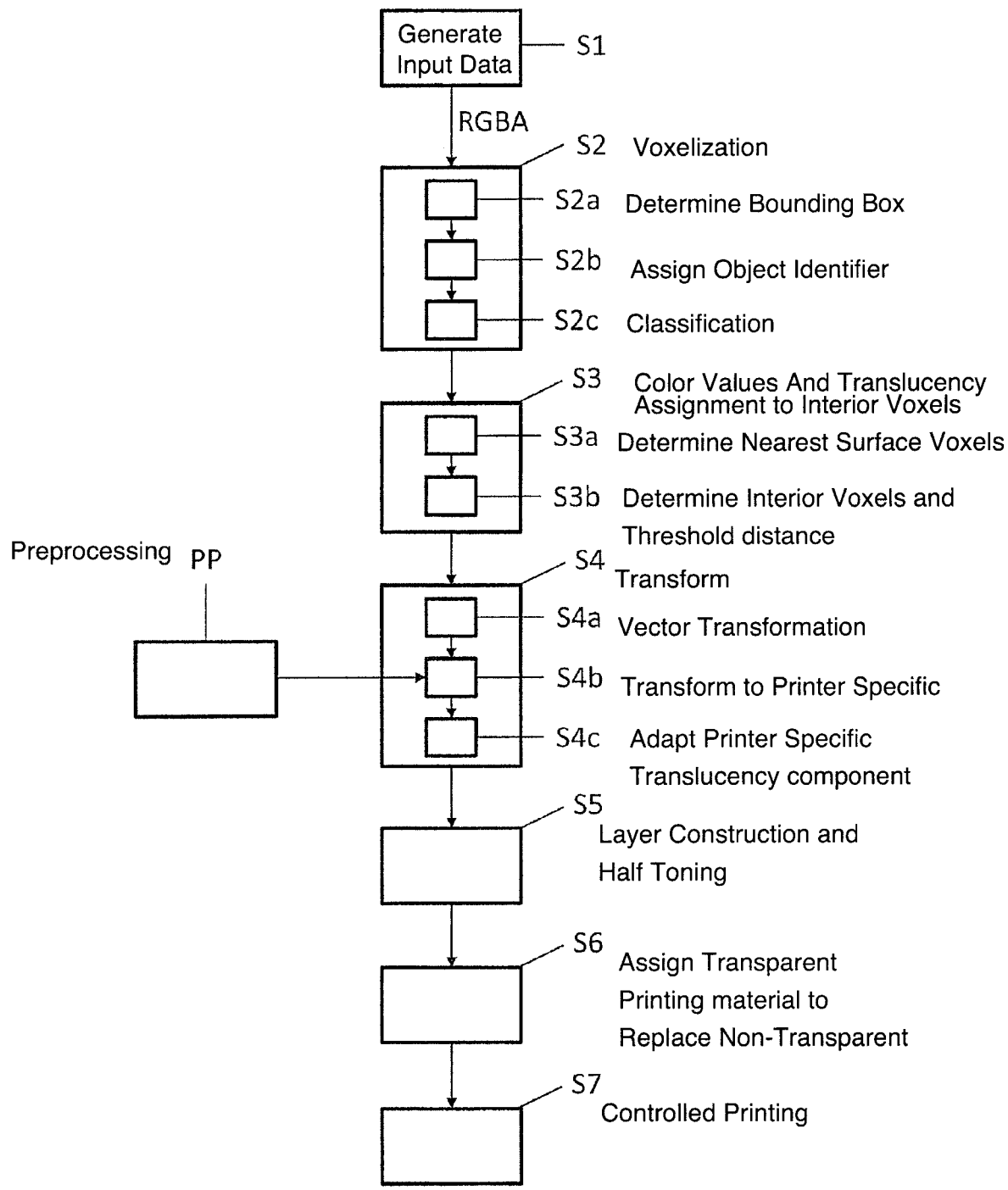

The invention will be described with reference to the attached figures. The figures show:

FIG. 1: A schematic block diagram of the 3D color printer,

FIG. 2: A schematic representation of printing object voxels,

FIG. 3: A schematic flow diagram of a method for 3D joint color and translucency printing, FIG. 4a: An exemplary and schematic representation of a x, y-slice of a printing object, FIG. 4b: Another exemplary and schematic representation of a x, y-slice of a printing object, FIG. 4c: Another exemplary and schematic representation of a x, y-slice of a printing object, FIG. 5: A schematic representation of color gamuts.

Figure 6:
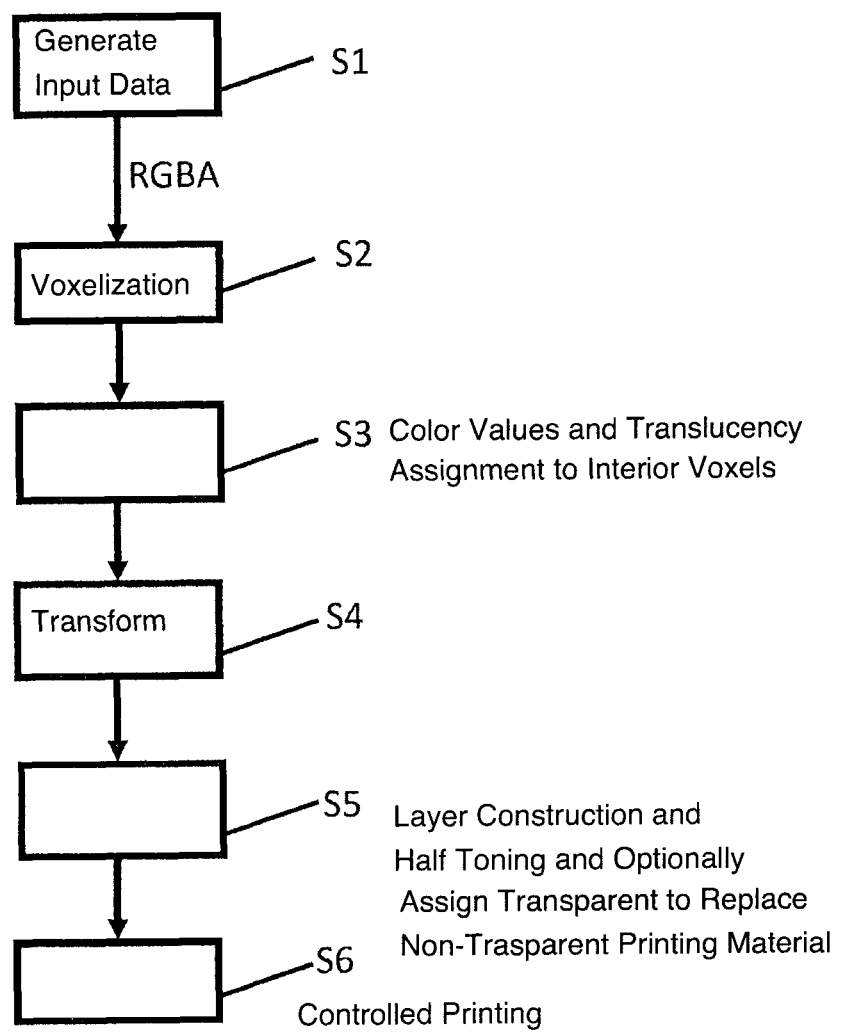

FIG. 6: A schematic flow diagram of a method for 3D joint color and translucency printing according to another embodiment.

DETAILED DESCRIPTION OF THE PREFERRED EMBODIMENTS

In the following, corresponding reference numerals denote elements with the same or similar technical features.

FIG. 1 shows a schematic representation of a 3-dimensional joint color and translucency printing device 1. The printing device 1 comprises a first print head 2 for printing a first non-transparent printing material with a first printing material color, e.g. a white color. The printing device further comprises a second print head 3 for printing a second non-transparent printing material with a second printing material color, e.g. a magenta color. Further, the printing device comprises a third print head 4 for printing a third non-transparent printing material with a third printing material color, e.g. a cyan color. Further, the printing device 1 comprises a fourth print head 5 for printing a transparent printing material 6. The printing material colors are different from one another. Further shown is a printing object 7 which is T-shaped.

Indicated is a reference coordinate system with a longitudinal axis which is also referred to as x-axis. An arrowhead indicates an x-direction. Further indicated is a vertical axis which is also referred to as z-axis, wherein an arrowhead indicates a vertical direction or z-direction. The vertical axis is pointing upwards. A lateral axis which is also referred to as y-axis can be oriented perpendicular the x-axis and the z-axis, wherein the axes can provide a right-hand Cartesian coordinate system.

The printing object 7 comprises portions in which transparent printing material 6 is arranged. These portions can be external or internal portions (interior object portions).

Further shown is that the printing device 1 comprises a control unit 8 for controlling a movement and/or an operation of the print heads 2, 3, 4, 5. The control unit 8 can comprise or be provided by at least one microcontroller.

In particular, the print heads 2, 3, 4, 5 which provide means for printing the printing materials can be controlled such that the printing materials are arranged within a surface region and a near surface interior region of the printing object 7 such that a desired color and translucency reproduction of the printing object 7 is provided. In other words, the arrangement of printing materials is provided such that a desired coloration of the printing object 7 is provided while also a desired translucency reproduction of the printing object 7 is ensured.

FIG. 2 shows a region of the printing object 7. Shown are voxels of the printing object 7, wherein these voxels can be provided by non-transparent printing material or transparent material 6.

With reference to the vertical direction, the voxels of the first row (highest row or top row) of voxels are surface voxels of a surface layer voxel set of the printing object 7. The remaining voxels, in particular the voxels within the remaining lower rows, are interior voxels of an interior voxel set of the printing object 7. In particular, the voxels of the second row can be voxels of a near surface interior layer voxel set, wherein the distances of all voxels of the near surface interior layer voxel set to the respective closest surface voxel are within a predetermined distance interval, in particular a distance interval ranging from a value corresponding to size of one voxel in the vertical direction to a maximal value corresponding to twice the height of one voxel in the vertical direction. Correspondingly, the voxels of the remaining rows can be voxels of other interior layer voxel sets or remaining interior voxels.

Voxels V6 provided by transparent printing material are indicated by shaded voxels. The remaining unshaded voxels indicate printing material voxels which are either provided by the first, the second or the third printing material. A first transparent printing material voxel V9 is an interior voxel. In particular, the interior object voxel V9 is fully enclosed by voxels.

Further indicated are surface voxels V10 which are also provided by transparent printing material 6.

Further indicated is an exemplary optical path 11 to an interior voxel V9, wherein three object voxels, e.g. non-transparent printing material voxels, are arranged between the (external) environment of the printing object 7 and the interior voxel V9. The printing material voxels along said optical path 11 can be provided such that desired transparency or translucence is provided, in particular for visible light. For instance, the transparency can be provided such that an attenuation of visible light along said optical path is smaller than 0.1.

FIG. 3 shows a schematic flow diagram of a method for 3D joint color and translucency printing. Each of the steps of the flow diagram can be performed by a processing and/or control unit, wherein a processing and/or control can comprise at least one or be provided by at least one microcontroller or a FGPA. It is possible that a different steps or different subsets of at least two steps are performed by different processing and/or control units. It is further possible that the control unit 8 shown in FIG. 1 performs one or more of the steps shown in FIG. 3.

In a first step S1, input data is generated. The input data can encode a shape- and texture-based representation of the printing object 7. In particular, the input data can encode RGBA vectors which are assigned to vertices of a graph-based shape representation of the printing object 7. The values of a color component RGB of the RGBA vector are defined in the RGB color space. The value of the translucency component A of the RGBA vector can denote a translucency parameter. A value range of the translucency parameter can include the values of 0 (inclusive) to 1 (inclusive), wherein a value of 1 corresponds to an opaque characteristic and 0 corresponds to a fully translucent characteristic. The first step S1 can be a pre-processing step for the proposed method.

The RGBA vector can denote a color value and a translucency information in a perceptually non-uniform space.

In second step S2, a voxelization is performed. By the voxelization, a voxel-based representation of the printing object 7 is determined. Further, a color value and translucency information, in particular a RGBA vector, is assigned to surface voxels of the printing object 7 in the voxel-based representation.

In a first sub step S2*a*, a bounding box of a surface section of the printing object 7 is determined. Further, for each voxel of the bounding box, it is tested if the respective voxel is intersected by a surface of the printing object 7 or by the surface of at least one sub-object of the printing object 7.

In particular, it is determined whether the voxel is intersected by the surface section of the graph-based representation of the printing object 7, e.g. a triangle which is spanned by three different vertices of the graph-based representation. This can e.g. be the case if the voxel centre which is projected into the plane of the surface section lies within the area enclosed by the surface section. Further, it is the determined whether the voxel is already assigned to a printing object 7 or a sub-object of said printing object 7.

If the voxel is already assigned to another (sub-) object, the next voxel of the bounding box is tested. If the respective voxel is not yet assigned to a (sub-) object, an object identifier of the current (sub-) object is assigned to the respective voxel in a second sub step S2b. Further, a RGBA vector can be assigned to the voxel. The RGBA vector can be determined depending on the shape- and texture-based representation, e.g. by interpolation.

In an optional third sub step S2c, for each (sub-) object, object voxels and object exterior voxels can be classified, wherein a corresponding (sub-) object identifier is assigned to all object voxel. This allows to easily identify voxels which belong to a certain (sub-) object, in particular for assigning RGBA vectors to object voxels of said (sub-) objects.

The assignment of an object identifier and a color value and translucency information, e.g. a RGBA vector, can be performed according to a priority-sorted sequence of (sub-) objects, wherein a prioritization is performed before voxelization is started in the second step S2. The prioritization can e.g. be based on a volume of the (sub-)object, wherein a priority value can be proportional to reciprocal of the (sub-)object volume.

In a third step S3, color values and translucency information, in particular RGBA vectors, are assigned to interior voxels of the object (s). Interior voxels can e.g. be determined based on the aforementioned classification.

It is e.g. possible to determine a set of all or a set of selected interior voxels of each sub-object or of the printing object 7. Selected interior voxels can e.g. be voxels of a near-surface interior voxel set. This set can comprise all interior voxels for which a distance to the respective nearest surface voxels is smaller than a predetermined distance threshold.

In particular, for each interior voxel of the interior voxel set, in particular the near-surface interior voxel set, the color value and translucency information, e.g. the RGBA vector, of its nearest surface voxel is assigned.

In a first sub step S3a, the nearest surface voxel to the respective interior voxel can be determined. In particular, the nearest surface voxel can be determined using a two-step approach, wherein in a first step, for each voxel within a x, y-slice, the z distance to the nearest surface voxel with the same x, y-coordinates is determined. Further, in a second step, a 2D distance transformation operation can be applied, wherein the distance transformation operation provides the minimal distance to a surface voxel based on the z-distances which have been determined in the first step for all voxels of x, y-slice. Such a 2D distance transformation operation can e.g. be provided by the aforementioned algorithm described in the document "Felzenszwalb, P. and Huttenlocher, D., Distance Transforms of Sampled Functions, Theory of Computing, vol. 8, pp. 415-428, 2012".

If the determined distance is smaller than or equal to the aforementioned predetermined distance threshold, the color value and translucency information, e.g. the RGBA vector, can be assigned to the respective interior voxel in a second sub step S3b. If the distance is higher than the predetermined distance threshold, a color value of a preset color component, e.g. a color component corresponding to the white color, can be assigned to the respective interior voxel. Further, the translucency component, in particular the A parameter of the RGBA vector, of the nearest surface voxel can be assigned to the respective interior voxel.

In a fourth step S4, the color values and translucency information, e.g. RGBA vectors, of all voxels can be transformed to a color value information within a quasi perceptually uniform color space and translucency information within a quasi perceptually uniform translucency space. In the following, such a quasi perceptually uniform color and translucency space can be denoted as CIELAB$\beta$ space, wherein the CIELAB component of such a vector denotes a component within a CIELAB color space and the translucency component $\beta$ denotes a translucency parameter within a quasi perceptually uniform translucency space. In particular, the color component of the color value and translucency information, e.g. the RGBA vector can be transformed into a CIELAB component of a CIELAB$\beta$ vector. Further the translucency component of the RGBA vector can be transformed into the translucency component $\beta$ of a CIELAB$\beta$ vector. Such a transformation can advantageously be dependent on a lateral and vertical light transport within the printing material.

This transformation can be performed in a first sub step S4a of the fourth step. In a second sub step S4b, the resulting color value and translucency information, e.g. the CIELAB$\beta$ vector, in the quasi perceptually uniform color and translucency space assigned to one voxel can be transformed into a printer-specific printing material color and translucency vector. In the following, a printer-specific printing material color and translucency vector is exemplarily denoted as CMYK$\gamma$ vector, wherein CMYK denotes a color component with tonal values for cyan, magenta, yellow and black and $\gamma$ denotes a translucency component. The transformation in the second sub step S4b of the fourth step S4 can be performed based on a predetermined assignment, e.g. provided by a look up table, of CIELAB$\beta$ vectors to CMYK$\gamma$ vectors. The predetermined assignment can be determined in a preprocessing PP, wherein the determination of the predetermined assignment has been explained before.

A value of "1" of the translucency-related entry of a CIELAB$\beta$ vector or CMYK$\gamma$ vector can correspond to full translucency, i.e. transparency, and a value of "0" to no translucency, i.e. to opacity.

In a third sub step S4c of the fourth step S4, the printer-specific translucency component of the printer-specific printing material color and translucency vector is adapted as a function of light transport effects. In particular, the $\gamma$ value is adapted as a function of depth and a predetermined threshold value t. Preferably, an adapted translucency component of the printer-specific printing material color and translucency vector is determined as $$\tau = \min(t,\gamma)/t \quad \text{formula 1}$$

if the distance of respective interior voxel to its nearest surface voxel is smaller than the predetermined distance threshold. Otherwise, $\tau$ is calculated as $$\tau = \max(0,\gamma-t)/(1-t) \quad \text{formula 2}$$

A result of the adaptation is a CMYK$\tau$ vector which comprises an adapted translucency component.

A result of the fourth step S4 is a voxel-based representation in which a printer-specific printing material color and translucency vector (with an unadapted or adapted translucency component) is assigned to each voxel.

In a fifth step S5, a layer construction and half-toning can be performed in order to assign a non-transparent printing material to each voxel. Such a half-toning can e.g. be performed according to the layered error diffusion approach which is described in in the aforementioned document "Brunton, Alan, Can Ates Arikan, and Philipp Urban, "Pushing the limits of 3d color printing: Error diffusion with translucent materials." ACM Transactions on Graphics (TOG) 35.1 (2015): 4." or in the aforementioned EP 3023229 A1.

A result of the fifth step S5 is a voxel-based representation in which a non-transparent printing material is assigned to each voxel.

In a sixth step S6, an assignment of a non-transparent printing material to one voxel is replaced by an assignment of the transparent printing material 6 (see FIG. 1) to said voxel as a function of the unadapted or adapted translucency parameter γ, τ which is assigned to said voxel. In particular, a random value is generated within the value interval of the translucency parameter γ, τ. If the random value is smaller than the translucency parameter, the non-transparent printing material of the voxel is replaced by the transparent printing material 6. Otherwise, no replacement is performed.

Preferably, the replacement is only performed for voxels to which a preset printing material, in particular a white printing material, is assigned.

A result of the sixth step S6 is a voxel-based representation of the printing object 7 in which also translucent voxels, i.e. voxels to which the transparent printing material 6 is assigned, are provided.

In a seventh step S7, a printing process of the printing object 7 is controlled as a function of the resulting assignment of printing materials to the voxels of the printing object 7.

Figure 4A:
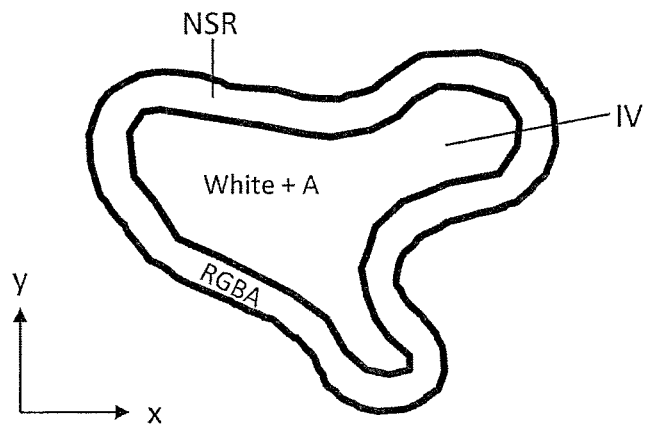

FIG. 4a shows an exemplary and schematic representation of a x, y-slice of a printing object 7 (see FIG. 1) after the third step S3 (see FIG. 3). Indicated is a near-surface region NSR. To all voxels of said near-surface region NSR, a RGBA vector is assigned.

To the remaining interior voxels IV, a white color printing material and the translucency component of the nearest surface voxel is assigned. In other words, the color and translucency information which is assigned to each of the remaining interior voxels IV comprises a color component corresponding to a white color and the translucency component of the nearest surface voxel of the respective voxel.

Figure 4B:
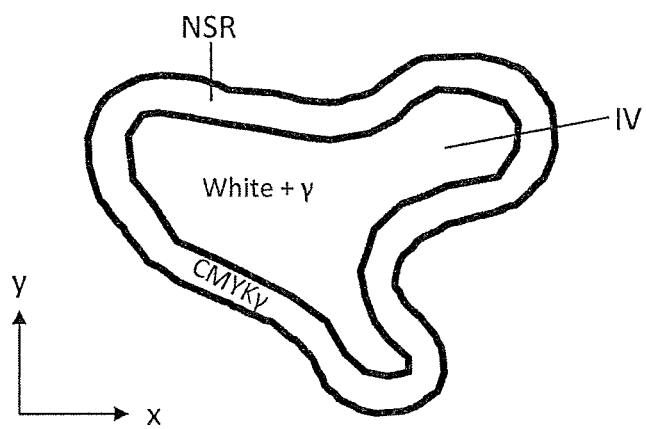

FIG. 4b shows the schematic and exemplary x, y-slice of a FIG. 4a after the first sub step S4a of the fourth step S4. In particular, a CMYKγ vector is assigned to each voxel of the near-surface region NSR, wherein a CMYKγ vector with color component corresponding to white color and a translucency component γ value is assigned to each voxel of the remaining interior voxels IV.

Figure 4C:
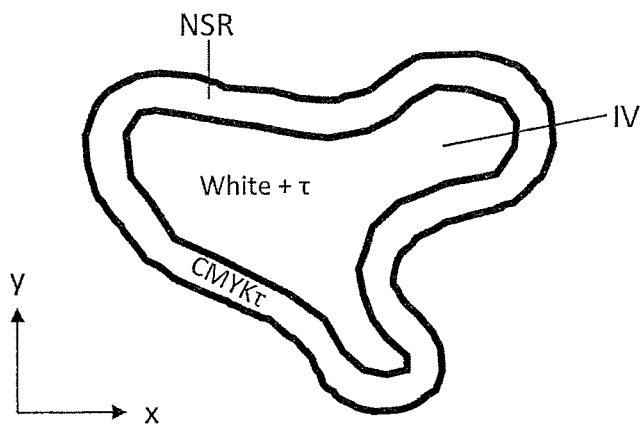

FIG. 4c shows a schematic and exemplary representation of the x, y-slice shown in FIG. 4b after the second sub step S4b of the fourth step S4. In particular, a CMYKτ vector is assigned to each voxel of the near-surface region NSR, wherein a CMYKτ vector with color component corresponding to white color and an adapted translucency component τ value is assigned to each voxel of the remaining interior voxels IV.

Figure 5:
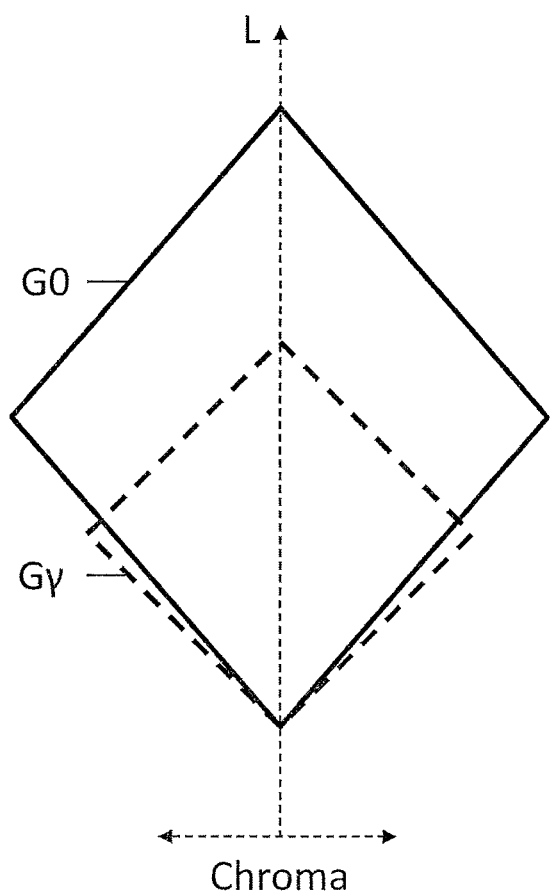

FIG. 5 shows a schematic and exemplary representation of color gamuts G0, Gγ. A first color gamut G0 indicates a color gamut of a reference set of printable colors, in particular the color gamut with an opaque translucency. A second gamut Gγ which is indicated by a dashed line schematically indicates a color gamut in the CIELAB space corresponding to a given translucency component γ. In order to provide the predetermined assignment for the transformation of a printing material color and translucency information into a printer-specific printing material color and translucency vector, the color gamut Gγ, in particular elements thereof, are mapped into the color gamut G0.

In the representation shown in FIG. 5, a x-axis can correspond to a chroma value, wherein a y-axis can correspond to a lightness value L.

FIG. 6 shows a flow diagram of a method according to the invention according to another embodiment. Each of the steps of the flow diagram can be performed by a processing and/or control unit, wherein a processing and/or control can comprise at least one or be provided by at least one microcontroller or a FGPA. It is possible that a different steps or different subsets of at least two steps are performed by different processing and/or control units. It is further possible that the control unit 8 shown in FIG. 1 performs one or more of the steps shown in FIG. 6.

In a first step S1, input data is generated, e.g. as RGBA vectors. The first step S1 of the embodiment shown in FIG. 6 can correspond to the first step S1 of the embodiment shown in FIG. 3. The first step S1 can be a pre-processing step for the proposed method. In a second step S2, a voxel-based representation of the printing object 7 (see FIG. 1) is determined, i.e. a voxelization is performed. In a third step, a desired color value and a desired translucency information, e.g. a RGBA vector, is assigned to each voxel of the voxel-based representation. The second and the third step S2, S3 of the embodiment shown in FIG. 6 can comprise one or more sub steps of the second step S2 and the third step S3 of the embodiment shown in FIG. 3.

In a fourth step S4, the color value and the translucency information assigned to one voxel is transformed into a printer-specific printing material color and translucency vector, e.g. a CMYKγ vector. This transformation can be a transformation from a device-independent space, e.g. RGBA space, into a device control space, here the CMYKγ space. Such transformations are generally known to the skilled person. Exemplary transformation schemes are outline in this disclosure. The fourth step S4 of the embodiment shown in FIG. 6 can correspond to the fourth step S4 of the embodiment shown in FIG. 3.

In a fifth step S5, one or more printing material(s) is/are assigned to one voxel depending on the assignment of printer-specific printing material color and translucency vectors to the voxels. The fifth step S5 of the embodiment shown in FIG. 6 can correspond to the fifth step S5 and, if desired, the sixth step S6, of the embodiment shown in FIG. 3.

In a sixth step S6, a printing process is controlled as a function of the resulting assignment of printing materials to voxels.

What is claimed is:
1. A method for three-dimensional joint color and translucency printing, wherein at least a first non-transparent printing material with a first printing material color and at least one transparent printing material is used to construct a printing object, wherein an arrangement of the first non-transparent printing material and the at least one transparent printing material is determined based on a desired color reproduction of the printing object, wherein the arrangement of the first non-transparent printing material and the at least one transparent printing material is determined based on a desired translucency reproduction of the printing object,
the method including
a. determining a voxel-based representation of the printing object prior to printing the printing object,
b. assigning a desired color value and a desired translucency information which represents a device-independent vector to each voxel of at least a subset of all voxels of the printing object, including adjusting the desired translucency information that is assigned to each said voxel by setting a translucency parameter representing a degree of translucency such that a desired lateral light transport and vertical light transport within the printing object is achieved, wherein varying values of the translucency parameter define varying lateral and vertical light transport, c. transforming the desired color value and the desired translucency information assigned to one voxel being the device-independent vector and including the translucency parameter defining the desired lateral and vertical light transport into a printer-specific printing material color and translucency vector, d. assigning a printing material to a voxel based on the printer-specific printing material color and translucency vector, e. controlling the printing process as a function of the resulting assignment of the printing materials to voxels.

2. The method according to claim 1, characterized in that the determination of the voxel-based representation includes the steps of
testing if the voxel is intersected by a surface of the printing object or at least one sub-object of the printing object,
assigning the desired color value and the desired translucency information to the voxel if the voxel is intersected by the surface.

3. The method according to claim 2, characterized in that a surface section of the printing object or of the at least one sub-object is determined, wherein a voxel bounding box of the surface section is determined, wherein for each or selected voxel(s) of the voxel bounding box, a surface intersection criterion is evaluated, wherein the voxel is intersected by the printing object or the at least one sub-object if the surface intersection criterion is fulfilled.

4. The method according to claim 1, characterized in that a surface section of the printing object or of the at least one sub-object is determined, wherein for said voxels of said surface section a voxel bounding box of the surface section is determined, wherein for each said or said selected voxel(s) of the voxel bounding box, a surface intersection criterion is evaluated, wherein the voxel is intersected by the printing object or the at least one sub-object if the surface intersection criterion is fulfilled.

5. The method according to claim 1, characterized in that an object prioritization is performed if multiple printing objects are provided, wherein the voxel-based representation is determined for each printing object according to a priority-sorted sequence of the printing objects.

6. The method according to claim 1, characterized in that a surface layer voxel set and an interior voxel set are determined, wherein the desired color value and the desired translucency information is assigned to each said voxel of the surface layer voxel set, and wherein the desired color value and the desired translucency information is assigned to each voxel of the interior voxel set.

7. The method according to claim 6, including a near-surface interior voxel set being a voxel set comprising only voxels of a near-surface interior region and not all interior voxels of the printing object, characterized in that at least for each said voxel of the near-surface interior voxel set, the color value and the translucency information of its nearest surface voxel or of a nearest point of a point set is assigned to said voxel of said near-surface interior voxel set, wherein for each voxel of a set of at least one remaining interior voxel, the color value information of a preset color and the translucency information of the nearest surface voxel or the nearest point of the point set is assigned to said voxel of said set of at least one remaining interior voxel.

8. The method according to claim 7, characterized in that the nearest surface voxel or nearest point of the point set of an interior voxel is determined by applying a two-step process, wherein, in a first step, for each voxel of/within a selected x, y-slice, a z-distance to the nearest surface voxel or nearest point of the point set with the same x, y coordinates is determined, wherein, in a further step, the nearest surface voxel or nearest point of the point set for each said voxel of the selected x,y-slice is determined using a 2D distance transformation.

9. The method according to claim 1, wherein the printer-specific printing material color has a translucency component, and wherein the method is characterized in that the translucency component of the printer-specific printing material color and translucency vector is adapted as a function of light transport effects.

10. The method according to claim 1, characterized in that the printer-specific printing material color and translucency vector is determined based on a predetermined assignment of the color value and the translucency information to printer-specific printing material color and translucency vectors.

11. The method according to claim 10, characterized in that the assignment of the color value and the translucency information to the printer-specific printing material color and translucency vector is performed using a printer predicting function and a gamut correction function.

12. The method according to claim 1, characterized in that the voxel-based representation of the printing object is determined, wherein one of the said printing materials is assigned to each said voxel, wherein the assignment of one or more of the said printing materials to a voxel is based on the desired color and the desired translucency reproduction of the printing object.

13. The method according to claim 12, characterized in that an assignment of one of the non-transparent printing materials to one of said voxels is replaced by an assignment of the transparent printing material to said one of said voxels as a function of the translucency information assigned to said one of said voxels.

14. The method according to claim 13, characterized in that the replacement by an assignment of the transparent printing material to said one of said voxels as a function of the translucency information assigned to said one of said voxels is only performed for voxels to which a preset color printing material is assigned.

15. A printing object obtained by a method for three-dimensional joint color and translucency printing according to claim 1.

16. The method according to claim 1, wherein increasing the value of the translucency information denotes an increasing translucency or a decreasing translucency, wherein input data encodes the desired color and translucency reproduction of the printing object, and wherein the input data encoding the desired color and translucency reproduction of the printing object is generated as color and translucency information.

17. A computer program product with a computer program fixed in a non-transitory medium, wherein the computer program comprises software means for the execution of a method for three-dimensional joint color and translucency printing according to claim 1 if the computer program is executed by or in an automation system.

18. A program fixed in a non-transitory medium which, when running on a computer, causes the computer to perform one or more or all steps of a method for three-dimensional joint color and translucency printing according to claim 1.

19. A program storage medium on which the program according to claim 18 is stored, in particular in a non-transitory form.

20. A computer comprising the program storage medium according to claim 19.

21. A 3 D joint color and translucency printing device, wherein the printing device comprises a means for printing at least a first non-transparent printing material with a first printing material color and a means for printing at least one transparent printing material, wherein the joint color and translucency printing device comprises at least one control unit, wherein the means for printing the first non-transparent printing material is controlled such the first non-transparent printing material is used to construct the printing object, wherein the means for printing the at least one transparent printing material is controlled such that the at least one transparent printing material is used to construct the printing object, wherein the means for printing the first non-transparent printing material and the at least one transparent printing material are controlled such that an arrangement of the printing materials is provided such that a desired color reproduction is provided, characterized in that the means for printing the first non-transparent printing material and the at least one transparent printing material are controlled such that an arrangement of the printing materials is provided such that a desired translucency reproduction of the printing object is provided, wherein a voxel-based representation of the printing object is determined prior to printing the printing object, wherein a desired color value and a desired translucency information which represents a device-independent vector is assigned to each voxel of at least a subset of all voxels of the printing object, wherein the desired translucency information assigned to each said voxel is done by setting a translucency parameter representing a degree of translucency such that a desired lateral light transport and vertical light transport within the printing object is achieved, wherein varying values of the translucency parameter define varying lateral and vertical light transport, wherein the color value and the translucency information assigned to one voxel being the device-independent vector and including the translucency parameter defining the desired lateral and vertical light transport within the printing object is transformed into a printer-specific printing material color and translucency vector, wherein an assignment of a printing material to a voxel is based on the printer-specific printing material color and the translucency vector, and wherein the printing process is controlled as a function of the resulting assignment of printing materials to voxels.

* * * * *